US012720509B2

(12) United States Patent
Hang et al.

(10) Patent No.: US 12,720,509 B2
(45) Date of Patent: Aug. 25, 2026

(54) RESOURCE DETERMINING METHOD AND RESOURCE DETERMINING APPARATUS

(71) Applicant: HUAWEI TECHNOLOGIES CO., LTD., Shenzhen (CN)

(72) Inventors: Haicun Hang, Shanghai (CN); Hongzhe Shi, Shenzhen (CN); Liuliu Ji, Shanghai (CN); Mingzhe Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 372 days.

(21) Appl. No.: 17/843,849

(22) Filed: Jun. 17, 2022

(65) Prior Publication Data

US 2022/0330245 A1 Oct. 13, 2022

Related U.S. Application Data

(63) Continuation of application No. PCT/CN2019/126787, filed on Dec. 19, 2019.

(51) Int. Cl.
*H04W 72/0453* (2023.01)
*H04W 72/02* (2009.01)

(52) U.S. Cl.
CPC ....... *H04W 72/0453* (2013.01); *H04W 72/02* (2013.01)

(58) Field of Classification Search
CPC .......................... H04W 72/0453; H04W 72/02
See application file for complete search history.

(56) References Cited

U.S. PATENT DOCUMENTS

| | | | | |
|---|---|---|---|---|
| 11,871,429 B2 * | 1/2024 | Lin | ....................... | H04W 48/16 |
| 2018/0192405 A1 * | 7/2018 | Gong | .................... | H04L 1/0075 |
| 2019/0313437 A1 | 10/2019 | Jung et al. | | |
| 2022/0052824 A1 * | 2/2022 | Kim | ...................... | H04L 1/1664 |
| 2022/0303795 A1 * | 9/2022 | Bala | ...................... | H04W 24/08 |

FOREIGN PATENT DOCUMENTS

| | | | | |
|---|---|---|---|---|
| AU | 2014202400 A1 * | 5/2014 | | |
| AU | 2013318674 B2 * | 4/2016 | ........... | H04L 5/0048 |
| CA | 2760505 A1 * | 11/2010 | ............ | H04W 72/23 |
| CA | 3131842 A1 * | 10/2020 | ........ | H04W 72/0453 |

(Continued)

OTHER PUBLICATIONS

Huawei, HiSilicon, Feature Summary of Enhancements on Multi-TRP/Panel Transmission. 3GPP TSG RAN WG1 Meeting #98bis, Chongqing, China, Oct. 14-20, 2019, R1-1911425, 100 pages.

(Continued)

*Primary Examiner* — Saad A. Waqas
(74) *Attorney, Agent, or Firm* — HAUPTMAN HAM, LLP

(57) ABSTRACT

A resource determining method includes selecting, by a terminal device from a plurality of search spaces, a search space of the plurality of search spaces that satisfies a preset condition. The plurality of search spaces correspond to search spaces for repeated transmission through a same downlink control channel. The resource determining method further includes determining, by the terminal device, an uplink control channel resource based on a control channel element (CCE) start location of the search space of the plurality of search spaces that satisfies the preset condition.

11 Claims, 8 Drawing Sheets

A terminal device determines a plurality of mutually associated search spaces — 103

↓

The terminal device selects, from the plurality of search spaces, a search space that meets a preset condition, where the plurality of search spaces are mutually associated — 101

↓

The terminal device determines an uplink control channel resource based on a control channel element CCE location of the search space that meets the preset condition — 102

(56) References Cited

FOREIGN PATENT DOCUMENTS

| | | | | |
|---|---|---|---|---|
| CN | 104754741 A | | 7/2015 | |
| CN | 104811263 A | | 7/2015 | |
| CN | 109150463 A | | 1/2019 | |
| CN | 110169174 A | | 8/2019 | |
| CN | 111418250 B | * | 12/2022 | ............. H04W 4/00 |
| WO | 2019099435 A1 | | 5/2019 | |

OTHER PUBLICATIONS

Extended European Search Report issued in corresponding European Application No. 19957000.3, dated Dec. 6, 2022, pp. 1-9.
3GPP TS 38.213 V15.7.0 (Sep. 2019), 3rd Generation Partnership Project; Technical Specification Group Radio Access Network; NR; Physical layer procedures for control(Release 15), 108 pages.
OPPO, Summary of offline discussion on PUCCH resource allocation. 3GPP TSG RAN WG1 Meeting #92bis, Sanya, China, Apr. 16-20, 2018, R1-1805667, 10 pages.
Huawei, HiSilicon, PDCCH enhancements for URLLC. 3GPP TSG RAN WG1 Meeting #96bis, Xi'an, China, Apr. 8-12, 2019, R1-1903954, 9 pages.
International Search Report issued in corresponding International Application No. PCT/CN2019/126787, dated Sep. 24, 2020, pp. 1-9.

* cited by examiner

RESOURCE DETERMINING METHOD AND RESOURCE DETERMINING APPARATUS

CROSS-REFERENCE TO RELATED APPLICATIONS

This application is a continuation of International Application No. PCT/CN2019/126787, filed on Dec. 19, 2019. The disclosures of the aforementioned application is hereby incorporated by reference in its entirety.

TECHNICAL FIELD

This application relates to the field of communication technologies, and in particular, to a resource determining method and a resource determining apparatus.

BACKGROUND

With rapid development of communication technologies, many small-packet burst services, for example, burst services with high reliability and low latencies, are generated in a communication process. This type of services has a high requirement on data reliability. Correspondingly, a requirement on control channel reliability is higher than a requirement on data reliability. Currently, a solution of repeated transmission through a control channel may be used to ensure the control channel reliability.

However, in a solution of repeated transmission through a downlink control channel, determining of an uplink control channel resource becomes a problem. A reason is as follows: In some cases, the uplink control channel resource is determined based on a control channel element (control channel element, CCE) location occupied by the downlink control channel. However, in the solution of repeated transmission through the downlink control channel, downlink control channels for repeated transmission carry same downlink control information, but occupy different CCE locations. Consequently, a unique uplink control channel resource cannot be determined. In other words, a terminal device cannot determine the uplink control channel resource for uplink transmission.

SUMMARY

This application provides a resource determining method and a resource determining apparatus, to determine a unique uplink control channel resource for a plurality of search spaces.

According to a first aspect, this application provides a resource determining method. In the method, a terminal device may select, from a plurality of search spaces, a search space that meets a preset condition, to determine an uplink control channel resource based on a control channel element CCE location of the search space that meets the preset condition.

The plurality of search spaces are search spaces having an association relationship, for example, search spaces for repeated transmission through a same downlink control channel, search spaces that determine one uplink control channel resource indicator PRI, or search spaces for jointly transmitting same downlink control information.

That same downlink control information is jointly transmitted in a plurality of search spaces means that a part of content in the downlink control information is transmitted in each of the plurality of search spaces, and the terminal device needs to monitor a downlink control channel carried in the plurality of search spaces to obtain the downlink control information. That repeated transmission through a same downlink control channel is performed in a plurality of search spaces means that the same downlink control channel information is separately transmitted in different search spaces, and the terminal device may monitor some or all of the plurality of search spaces to obtain the downlink control information.

When an uplink control channel resource set includes a large quantity of uplink control channel resources, and the quantity of uplink control channel resources exceeds a quantity that can be indicated by using the uplink control channel resource indicator, the terminal device may determine a unique uplink control channel resource based on the CCE location occupied by the search space that meets the preset condition.

When the uplink control channel resource is determined based on the CCE location of the search space that meets the preset condition, the CCE location may be a start CCE location, an end CCE location, or the like in the CCE location occupied by the search space. The following mainly uses the CCE start location as an example.

One search space includes/CCEs on a time-frequency resource, where/is an aggregation level, that is, a quantity of CCEs occupied by one downlink control channel. The terminal device may determine a search space based on a search space group and a control resource set that are configured by a network device. The search space group is used to define a possibility of monitoring time domain information of a downlink control channel. The control resource set is used to define a possibility of monitoring frequency domain information of the downlink control channel A plurality of search spaces may be determined based on one search space group and one control resource set.

The preset condition includes one or more of the following: an identifier of a corresponding control resource set is smallest or largest; an identifier of a corresponding search space group is smallest or largest; a corresponding aggregation level is lowest or highest; an identifier of a CCE start location is smallest or largest; or an identifier of a corresponding control resource set group is smallest or largest. In this way, a unique search space that meets the preset condition is determined.

The following describes optional implementations but not limited to the following several implementations for determining of a plurality of search spaces. The plurality of search spaces have an association relationship as described above, and therefore may be referred to as a plurality of associated or mutually associated search spaces. In other words, the terminal device may determine the plurality of associated search spaces in the following optional implementations.

In an implementation, the plurality of search spaces are determined based on a plurality of control resource sets associated with one search space group. In other words, the terminal device determines the plurality of associated search spaces based on the search space group and the plurality of control resource sets.

In a possible implementation method, it is assumed that one search space group is associated with two control resource sets: a control resource set $M_1$ and a control resource set $M_2$. That the terminal device determines the plurality of mutually associated search spaces based on the search space group and the plurality of control resource sets associated with the search space group includes:

The terminal device determines a first search space set based on the search space group and the control resource set $M_1$, where the first search space set includes a search space $M1_1$, a search space $M1_2$, . . . , and a search space $M1_{N1}$; and the terminal device determines a second search space set based on the search space group and the control resource set $M_2$, where the second search space set includes a search space $M2_1$, a search space $M2_2$, . . . , and a search space $M2_{N2}$, where N1 may be equal to or not equal to N2, and N1 and N2 each represent a quantity of determined search spaces.

The following indication may be protocol-predefined: There is a one-to-one association relationship between the first K search spaces in the first search space set and the first K search spaces in the second search space set. The terminal device determines that there is a one-to-one association relationship between the first K search spaces in the first search space set and the first K search spaces in the second search space set. That is, a search space $M1_k$ is associated with a search space $M2_k$, where a value interval of k is [1, K], and K is the smaller one of N1 and N2.

Optionally, the following indication may be protocol-predefined: There is a one-to-one association relationship between the last K search spaces in the first search space set and the last K search spaces in the second search space set.

Optionally, the following indication may be configured using signaling: There is a one-to-one association relationship between K search spaces selected from the first search space set and K search spaces selected from the second search space set.

Optionally, the first search space set includes a plurality of aggregation levels, and the second search space set includes a plurality of aggregation levels. A plurality of search spaces that are respectively from the two search space sets and that correspond to a same aggregation level are mutually associated.

Optionally, the search spaces in the first search space set and the search spaces in the second search space set may be separately sorted in a predefined manner. The predefined manner may include: sorting search spaces based on occupied CCE start locations; first sorting search spaces based on occupied start symbols (or start symbol locations), and then sorting, based on occupied CCE start locations, search spaces occupying a same start symbol; first sorting search spaces based on corresponding aggregation levels, for example, the aggregation levels are sorted in ascending order or in descending order, and then sorting, based on occupied CCE start locations or occupied start symbols, search spaces corresponding to a same aggregation level; or first sorting search spaces based on occupied CCE start locations, and then sorting, based on occupied start symbols, search spaces occupying a same CCE start location.

In another possible implementation method, assuming that one search space group is associated with three control resource sets, an implementation method similar to the foregoing implementation method may be used to determine that every three search spaces are associated. For example, same downlink control information may be repeatedly transmitted in the three associated search spaces.

In this implementation, identifiers of control resource sets corresponding to mutually associated search spaces are different, and the preset condition may be that an identifier of a corresponding control resource set is smallest or largest. In this way, the terminal device may select, from the plurality of mutually associated search spaces, the search space that meets the preset condition, to determine the uplink control channel resource. For example, the search space $M1_k$ is associated with the search space $M2_k$. If $M_1$ is greater than $M_2$, and the preset condition is that an identifier of a corresponding control resource set is smallest, the search space that meets the preset condition is the search space $M2_k$.

In another implementation, the plurality of mutually associated search spaces are determined based on N configured search space groups and M control resource sets associated with each of the N search space groups. N is greater than or equal to 1, and M is greater than or equal to 1. The terminal device determines one search space set based on the N search space groups and the M control resource sets associated with each of the N search space groups.

The terminal device sorts search spaces in the search space set according to a specific rule, to obtain a sorted search space set: a search space 1, a search space 2, . . . , and a search space N3.

Further, a network side delivers one piece of signaling to the terminal device, to notify the terminal device of offset offset values of the associated search spaces. The terminal device determines the plurality of mutually associated search spaces from the search space set based on the offset offset values configured using signaling. For example, a search space 1 is associated with a search space (1+offset value); or a search space 1, a search space (1+offset value), and a search space (1+offset value*2) are mutually associated.

When the terminal device sorts the search spaces in the search space set according to a specific rule, the specific rule may be: sorting search spaces based on one or more of occupied CCE start locations, identifiers IDs of corresponding search space groups, identifiers of corresponding control resource sets, or corresponding aggregation levels. The following describes optional sorting manners by using examples.

In a possible implementation method, the search spaces in the search space set are sorted in ascending order of CCE start locations respectively occupied by the search spaces.

In another possible implementation method, the search spaces in the search space set are sorted in ascending order (or in descending order) of identifiers IDs of search space groups respectively corresponding to the search spaces, then search spaces corresponding to search space groups with a same identifier ID are sorted in ascending order (or in descending order) of identifiers IDs of control resource sets respectively corresponding to the search spaces, and finally, search spaces corresponding to control resource sets with a same identifier ID are sorted in ascending order (or in descending order) of aggregation levels corresponding to the search spaces.

In still another possible implementation method, the search spaces in the search space set are sorted in ascending order (or in descending order) of identifiers IDs of control resource sets respectively corresponding to the search spaces, then search spaces corresponding to control resource sets with a same identifier ID are sorted in ascending order (or in descending order) of identifiers IDs of search space groups respectively corresponding to the search spaces, and finally, search spaces corresponding to search space groups with a same identifier ID are sorted in ascending order (or in descending order) of aggregation levels corresponding to the search spaces.

In this implementation, the preset condition includes one or more of the following: an identifier of a corresponding control resource set is smallest or largest; an identifier of a corresponding search space group is smallest or largest; a corresponding aggregation level is lowest or highest; an identifier of a CCE start location is smallest or largest; or an identifier of a corresponding control resource set group is largest or smallest. If a search space 1 is associated with a search space (1+offset value), the preset condition is that an identifier of a CCE start location is smallest, and the search spaces in the search space set are sorted in ascending order of CCE start locations respectively occupied by the search spaces. In this case, the search space that meets the preset condition is the search space 1.

An identifier of a control resource set group corresponding to a search space is an identifier of a control resource set group included in a control resource set corresponding to the search space. In a multi-station scenario, identifiers of control resource set groups included in all control resource sets are different. If an identifier of a control resource set group included in a control resource set does not exist or is 0, it indicates that the identifiers of the control resource set groups are the same. If an identifier of a control resource set group included in a control resource set does not exist or is 0, and an identifier of a control resource set group included in another control resource set is 1, it indicates that the identifier of the control resource set group whose identifier does not exist or is 0 is less than the identifier of the control resource set group whose identifier is 1.

Optionally, the protocol specifies that associated search spaces need to have a same aggregation level, or the terminal does not expect to receive associated search spaces having different aggregation levels. In this case, the search spaces in the search space set are sorted, and the search space set may be preferentially divided, based on aggregation levels, into search space subsets corresponding to the aggregation levels. Search spaces in each search space subset have a same aggregation level. Correspondingly, the offset offset value configured using signaling is for the search space subset. Because a quantity of search spaces in the search space subset is less than a quantity of search spaces in the search space set, a value range of the offset offset value may be reduced, thereby reducing bit overheads of the offset value.

For a sorting manner of the search spaces in each search space subset, refer to the optional implementation method of the "specific rule", and details are not described herein again.

In still another implementation, the plurality of search spaces are determined based on a plurality of search space groups associated with one control resource set, to be specific, the plurality of search spaces are determined based on an association relationship between the control resource set and the plurality of search space groups. In this way, the terminal device may determine the plurality of mutually associated search spaces based on the control resource set and the plurality of associated search space groups.

In a possible implementation method, it is assumed that two search space groups are associated with one control resource set, and the two search space groups are an SS set $O_1$ and an SS set $O_2$. That the terminal device may determine the plurality of mutually associated search spaces based on the control resource set and the plurality of associated search space groups includes: The terminal device determines a third search space set based on the SS set $O_1$ and the control resource set, where the third search space set includes a search space $O1_1$, a search space $O1_2$ and a search space $O1_{N4}$; and the terminal device determines a fourth search space set based on the SS set $O_2$ and the control resource set, where the fourth search space set includes a search space $O2_1$, a search space $O2_2$, . . . , and a search space $O2_{N5}$.

N4 may be equal to or not equal to N5, and N4 and N5 each represent a quantity of search spaces in each search space set. The terminal device determines that there is a one-to-one association relationship between the first K search spaces in the third search space set and the first K search spaces in the fourth search space set. That is, a search space $O1_k$ is associated with a search space $O2_k$, where a value interval of k is [1, K], and K is the smaller one of N4 and N5.

Optionally, the following indication may be protocol-predefined: There is a one-to-one association relationship between the last K search spaces in the third search space set and the last K search spaces in the fourth search space set.

Optionally, the following indication may be configured using signaling: There is a one-to-one association relationship between K search spaces selected from the third search space set and K search spaces selected from the fourth search space set.

Optionally, the third search space set includes a plurality of aggregation levels, and the fourth search space set includes a plurality of aggregation levels. A plurality of search spaces that are respectively from the two search space sets and that correspond to a same aggregation level are mutually associated.

In another possible implementation method, assuming that three search space groups are associated with one control resource set, an implementation method similar to the foregoing implementation method may be used to determine that every three search spaces are associated. Same downlink control information may be repeatedly transmitted in the three associated search spaces.

In this implementation, identifiers of search space groups corresponding to mutually associated search spaces are different, and the preset condition may be that an identifier of a corresponding search space group is smallest or largest. In this way, the terminal device may select, from the plurality of mutually associated search spaces, the search space that meets the preset condition, to determine the uplink control channel resource. For example, the search space $O1_k$ is associated with the search space $O2_k$. If O1 is greater than O2, and the preset condition is that an identifier of a corresponding search space group is smallest, the search space that meets the preset condition is the search space $O2_k$.

In still another implementation, the third search space set and the fourth search space set determined in the foregoing two implementations may be further distinguished based on different aggregation levels.

In an implementation method, that the terminal device determines a plurality of mutually associated search spaces based on a control resource set, and an SS set O1 and an SS set $O_2$ that are associated with the control resource set includes: The terminal device determines, based on the SS set $O_1$ and the control resource set, that search spaces corresponding to an aggregation level l in the third search space set are respectively {a search space $l^{O1}{}_1$, a search space $l^{O1}2$, . . . , a search space $l^{O1}{}_{N6}$}, where N6 is less than or equal to N4; and the terminal device determines, based on the SS set $O_2$ and the control resource set, that search spaces corresponding to the aggregation level l in the fourth search space set are respectively {a search space $l^{O2}{}_1$, a search space $l^{O2}{}_2$, . . . , a search space $l^{O2}{}_{N7}$}, where N7 is less than or equal to N5.

N6 may be equal to or not equal to N7. An association relationship between search spaces is protocol-predefined or configured using signaling: A search space $l^{O1}{}_k$ is associated with a search space $l^{O2}{}_k$, where a value interval of k is [1, K], K is the smaller one of N6 and N7, and 1 represents an aggregation level corresponding to the search space.

In another implementation method, that the terminal device determines the plurality of mutually associated search spaces based on a search space group, and a CORE- SET $M_1$ and a CORESET $M_2$ that are associated with the search space group includes: The terminal device determines, based on the CORESET $M_1$ and the search space group, that search spaces corresponding to an aggregation level l in the first search space set are respectively a search space $l^{M1}{}_1$, a search space $l^{M1}{}_2$, . . . , a search space $l^{M1}{}_{N8}$, where N8 is less than or equal to N1; and the terminal device determines, based on the CORESET $M_2$ and the search space group, that search spaces corresponding to the aggregation level l in the second search space set are respectively {a search space $l^{M2}{}_1$, a search space $l^{M2}{}_2$, . . . , a search space $l^{M2}{}_{N9}$}, where N9 is less than or equal to N2.

N8 may be equal to or not equal to N9. An association relationship between search spaces is protocol-predefined or configured using signaling: A search space $l^{M1}{}_k$ is associated with a search space $l^{M2}{}_k$, where a value interval of k is [1, K], K is the smaller one of N8 and N9, and l represents an aggregation level corresponding to the search space.

In an implementation, the plurality of search spaces includes a search space in which the downlink control channel is detected and at least one search space associated with the search space. In a possible implementation method, before the terminal device selects, from the plurality of search spaces, the search space that meets the preset condition, the method further includes: When detecting the downlink control channel, the terminal device determines, based on the foregoing implementations, the at least one search space associated with the search space in which the downlink control channel is detected, to obtain a plurality of mutually associated search spaces.

According to a second aspect, this application further provides a channel transmission method. In the method, a terminal device determines an uplink control channel resource based on a control channel element CCE start location of a search space in which a downlink control channel is detected, and the terminal device sends an uplink control channel on the uplink control channel resource. The search space in which the downlink control channel is detected is one of a plurality of search spaces, and in the plurality of search spaces, ratios of CCE start locations of the search spaces to a quantity of CCEs in a control resource set corresponding to the search spaces are all equal.

The plurality of search spaces are search spaces having an association relationship, for example, search spaces for repeated transmission through the same downlink control channel, search spaces that determine one uplink control channel resource indicator PRI, or search spaces for jointly transmitting same downlink control information.

It can be learned that for a plurality of search spaces, ratios of CCE start locations of the search spaces to a quantity of CCEs in a control resource set corresponding to the search spaces are all equal to a same value. In this way, uplink control channel resources determined by the terminal device based on all of the plurality of search spaces are the same.

In a possible implementation, there is one uplink control channel resource indicator PRI determined by the plurality of search spaces. In this way, when a quantity of uplink control channel resources in an uplink control channel resource set is greater than a quantity of uplink control channel resources that can be indicated by using the PRI, because the ratios of the CCE start locations occupied by the search spaces to the quantity of CCEs in the control resource set corresponding to the search spaces are equal, the terminal device may determine a unique uplink control channel resource based on a CCE location occupied by the search space in which the downlink control channel is detected.

In another possible implementation, the plurality of search spaces are respectively search spaces for repeated transmission through the same downlink control channel. It can be learned that, in a scenario of repeated transmission through a downlink control channel, because ratios of CCE start locations of the search spaces to a quantity of CCEs in a control resource set corresponding to the search spaces are all equal to a same value, the terminal device may determine a unique uplink control channel resource based on a CCE location occupied by any search space, for example, the search space in which the downlink control channel is detected.

It can be learned that, in the method according to the second aspect, a plurality of mutually associated search spaces are limited to some extent. For example, the foregoing ratios are all equal or equal to a same value, so that the terminal device can uniquely determine an uplink control channel resource. Further, when correctly obtaining one piece of downlink control information through decoding, the terminal device may ignore detection in another search space with a same ratio, to reduce blind detection complexity of the terminal device.

According to a third aspect, this application further provides a resource determining method. The method is described from a perspective of a network device. The network device may perform an operation similar to that of the terminal device in the first aspect. The network device selects, from a plurality of search spaces, a search space that meets a preset condition, and the network device determines an uplink control channel resource based on a control channel element CCE location of the search space that meets the preset condition. It can be learned that the network device may determine a same unique uplink control channel resource for a plurality of search spaces, to obtain uplink control information.

The plurality of search spaces are search spaces having an association relationship, for example, search spaces for repeated transmission through a same downlink control channel, search spaces that determine one uplink control channel resource indicator PRI, or search spaces for jointly transmitting same downlink control information.

The CCE location of the search space may be referred to as a CCE location occupied by the search space. For example, the uplink control channel resource may be determined based on a CCE start location or a CCE end location occupied by the search space.

In an implementation, there is one uplink control channel resource indicator PRI determined by the plurality of search spaces. In this way, when an uplink control channel resource set includes a large quantity of uplink control channel resources, a unique uplink control channel resource may be determined by using the search space that meets the preset condition and that is in the plurality of search spaces.

In another implementation, the plurality of search spaces are respectively search spaces for repeated transmission through the same downlink control channel. It can be learned that in a scenario of repeated transmission through a same downlink control channel, the network device may determine a unique uplink control channel resource by using the search space that meets the preset condition and that is in the plurality of search spaces.

In an implementation, the preset condition includes one or more of the following: an identifier of a corresponding control resource set is smallest or largest; an identifier of a corresponding search space group is smallest or largest; a corresponding aggregation level is lowest or highest; an identifier of a CCE start location is smallest or largest; or an identifier of a control resource set is largest or smallest.

In an implementation, the plurality of search spaces are determined based on one or more control resource sets associated with a search space group; the plurality of search spaces are determined based on a plurality of search space groups associated with one control resource set; or the plurality of search spaces are determined based on an offset offset value configured using signaling.

For this aspect, refer to related content in the first aspect. Details are not described herein again.

According to a fourth aspect, this application further provides a resource determining method. Compared with the second aspect, the method is described from a perspective of a network device. The network device determines an uplink control channel resource based on a control channel element CCE location of any one of a plurality of search spaces, and the network device receives an uplink control channel on the uplink control channel resource. In the plurality of search spaces, ratios of CCE locations occupied by the search spaces to a quantity of CCEs in a control resource set corresponding to the search spaces are all equal.

The plurality of search spaces are search spaces having an association relationship, for example, search spaces for repeated transmission through a same downlink control channel, search spaces that determine one uplink control channel resource indicator PRI, or search spaces for jointly transmitting same downlink control information.

Correspondingly, when the network device delivers downlink control information or a downlink control channel by using a plurality of search spaces, in the plurality of search spaces, ratios of CCE locations occupied by the search spaces to a quantity of CCEs in a control resource set corresponding to the search spaces are all equal. The CCE location occupied by each search space may be a CCE start location or a CCE end location occupied by the search space.

In a possible implementation, there is one uplink control channel resource indicator PRI determined by the plurality of search spaces. In this way, when a quantity of uplink control channel resources in an uplink control channel resource set is greater than a quantity of uplink control channel resources that can be indicated by using the PRI, because the ratios of the CCE locations occupied by the search spaces to the quantity of CCEs in the control resource set corresponding to the search spaces are equal, the network device may determine a unique uplink control channel resource based on a CCE location occupied by any one of the search spaces.

In another possible implementation, the plurality of search spaces are respectively search spaces for repeated transmission through the same downlink control channel. It can be learned that in a scenario of repeated transmission through a downlink control channel, because ratios of CCE locations of the search spaces to a quantity of CCEs in a control resource set corresponding to the search spaces are all equal to a same value, the network device may determine a unique uplink control channel resource by using any one of the search spaces.

It can be learned that the network device may determine a same uplink control channel resource for any one of the plurality of search spaces, to reduce complexity of monitoring uplink control information.

For descriptions of this aspect, refer to related content in the second aspect. Details are not described herein again.

According to a fifth aspect, this application further provides a communication apparatus. The communication apparatus has some or all functions of implementing the terminal device in the method examples in the first aspect and the second aspect. For example, functions of the communication apparatus may have some or all functions of embodiments of this application, or may have a function of independently implementing any embodiment in this application. The functions may be implemented by hardware, or may be implemented by hardware by executing corresponding software. The hardware or the software includes one or more units or modules corresponding to the functions.

In a possible design, a structure of the communication apparatus may include a processing unit and a communication unit. The processing unit is configured to support the communication apparatus in performing a corresponding function in the foregoing method. The communication unit is configured to support communication between the communication apparatus and another device. The communication apparatus may further include a storage unit. The storage unit is coupled to the processing unit and a sending unit, and the storage unit stores program instructions and data that are necessary for the communication apparatus.

In an implementation, the communication apparatus includes:

a processing unit, configured to: select, from a plurality of search spaces, a search space that meets a preset condition, where the plurality of search spaces are search spaces for repeated transmission through a same downlink control channel; and determine an uplink control channel resource based on a control channel element CCE start location of the search space that meets the preset condition; and a communication unit, configured to send an uplink control channel on the uplink control channel resource.

In another implementation, the communication apparatus includes:

a processing unit, configured to determine an uplink control channel resource based on a control channel element CCE start location of any one of a plurality of search spaces; and a communication unit, configured to receive an uplink control channel on the uplink control channel resource, where the plurality of search spaces are search spaces for repeated transmission through a same downlink control channel, and in the plurality of search spaces, ratios of CCE start locations of the search spaces to a quantity of CCEs in a control resource set corresponding to the search spaces are all equal.

In an example, the processing unit may be a processor, the communication unit may be a transceiver or a communication interface, and the storage unit may be a memory.

In an implementation, the communication apparatus includes:

the processor, configured to: select, from a plurality of search spaces, a search space that meets a preset condition, where the plurality of search spaces are search spaces for repeated transmission through a same downlink control channel; and determine an uplink control channel resource based on a control channel element CCE start location of the search space that meets the preset condition; and the transceiver, configured to send an uplink control channel on the uplink control channel resource.

In another implementation, the communication apparatus includes:

the processor, configured to determine an uplink control channel resource based on a control channel element CCE start location of a search space in which a downlink control channel is detected; and the transceiver, configured to send an uplink control channel on the uplink control channel resource, where the search space in which the downlink control channel is detected is one of a plurality of search spaces, the plurality of search spaces are search spaces for repeated transmission through the same downlink control channel, and in the plurality of search spaces, ratios of CCE start locations of the search spaces to a quantity of CCEs in a control resource set corresponding to the search spaces are all equal.

According to a sixth aspect, this application further provides a communication apparatus. The communication apparatus has some or all functions of implementing the network device in the method example in the third aspect, or some or all functions of implementing the network device in the method embodiment in the fourth aspect. For example, a function of the communication apparatus may have functions of the network device in some or all embodiments in this application, or may have a function of independently implementing any embodiment in this application. The functions may be implemented by hardware, or may be implemented by hardware by executing corresponding software. The hardware or the software includes one or more units or modules corresponding to the functions.

In a possible design, a structure of the communication apparatus may include a processing unit and a communication unit. The communication unit is configured to support the communication apparatus in performing a corresponding function in the foregoing method. The communication unit is configured to support communication between the communication apparatus and another device, for example, communication between the communication apparatus and a terminal device. The communication apparatus may further include a storage unit. The storage unit is coupled to an obtaining unit and a sending unit, and the storage unit stores program instructions and data that are necessary for the communication apparatus.

In an implementation, the communication apparatus includes:

a processing unit, configured to: select, from a plurality of search spaces, a search space that meets a preset condition, where the plurality of search spaces are search spaces for repeated transmission through a same downlink control channel; and determine an uplink control channel resource based on a control channel element CCE start location of the search space that meets the preset condition; and a communication unit, configured to receive an uplink control channel on the uplink control channel resource, where the plurality of associated search spaces are respectively search spaces for repeated transmission through the same downlink control channel.

In another implementation, the communication apparatus includes:

a processing unit, configured to determine an uplink control channel resource based on a control channel element CCE start location of any one of a plurality of search spaces; and a communication unit, configured to receive an uplink control channel on the uplink control channel resource, where the plurality of search spaces are search spaces for repeated transmission through a same downlink control channel, and in the plurality of search spaces, ratios of CCE start locations of the search spaces to a quantity of CCEs in a control resource set corresponding to the search spaces are all equal.

In an implementation, the communication apparatus includes:

the processor, configured to determine an uplink control channel resource based on a control channel element CCE start location of a search space in which a downlink control channel is detected; and the transceiver, configured to send an uplink control channel on the uplink control channel resource, where the search space in which the downlink control channel is detected is one of a plurality of search spaces, the plurality of search spaces are search spaces for repeated transmission through the same downlink control channel, and in the plurality of search spaces, ratios of CCE start locations of the search spaces to a quantity of CCEs in a control resource set corresponding to the search spaces are all equal.

In another implementation, the communication apparatus includes:

the processor, configured to determine an uplink control channel resource based on a control channel element CCE start location of any one of a plurality of search spaces; and the transceiver, configured to receive an uplink control channel on the uplink control channel resource, where the plurality of search spaces are search spaces for repeated transmission through a same downlink control channel, and in the plurality of search spaces, ratios of CCE start locations of the search spaces to a quantity of CCEs in a control resource set corresponding to the search spaces are all equal.

In a specific implementation process, the processor may be configured to perform, for example, but not limited to, baseband-related processing, and the transceiver may be configured to perform, for example, but not limited to, radio frequency transmission. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more and more components may be integrated on a same chip. For example, the digital baseband processor may be integrated on a same chip with a plurality of application processors (for example, but not limited to a geometric processor and a multimedia processor). Such a chip may be referred to as a system on chip (system on chip). Whether components are independently disposed on different chips or are integrated and disposed on one or more chips usually depends on specific requirements of a product design. A specific implementation form of the foregoing components is not limited in this embodiment of the present invention.

According to a seventh aspect, this application further provides a processor, configured to perform the foregoing methods. In a process of performing these methods, a process of sending the information and a process of receiving the information in the methods may be understood as a process of outputting the information by the processor and a process of receiving the input information by the processor. Specifically, when outputting the information, the processor outputs the information to a transceiver, so that the transceiver transmits the information. Still further, after the information is output by the processor, other processing may further need to be performed on the information before the information arrives at the transceiver. Similarly, when the processor receives the input information, the transceiver receives the information and inputs the information into the processor. Still further, after the transceiver receives the information, other processing may need to be performed on the information before the information is input into the processor.

Based on the foregoing principle, for example, receiving the joint feedback information mentioned in the foregoing method may be understood as inputting the joint feedback information by the processor. For another example, sending the joint feedback information may be understood as that outputting the joint feedback information by the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In a specific implementation process, the processor may be a processor specially configured to perform these methods, or a processor, for example, a general purpose processor, that executes computer instructions in a memory to perform these methods. The memory may be a non-transitory (non-transitory) memory such as a read-only memory (read-only memory, ROM). The memory and the processor may be integrated on a same chip, or may be separately disposed on different chips. A type of the memory and a manner of disposing the memory and the processor are not limited in embodiments of the present invention.

According to a seventh aspect, an embodiment of the present invention provides a computer-readable storage medium, configured to store computer software instructions used by the foregoing terminal. The computer-readable storage medium includes a program used to perform the first aspect or the second aspect of the foregoing method.

According to an eighth aspect, an embodiment of the present invention provides a computer-readable storage medium, configured to store computer software instructions used by the foregoing network device. The computer-readable storage medium includes a program used to perform the third aspect or the fourth aspect of the foregoing method.

According to a ninth aspect, this application further provides a computer program product including instructions. When the computer program product runs on a computer, the computer is enabled to perform the method according to the first aspect or the second aspect.

According to a tenth aspect, this application further provides a computer program product including instructions. When the computer program product runs on a computer, the computer is enabled to perform the method according to the third aspect or the fourth aspect.

According to an eleventh aspect, this application provides a chip system. The chip system includes a processor and an interface, configured to support a terminal in implementing a function in the first aspect or the second aspect, for example, determining or processing at least one of data or information in the foregoing method. In a possible design, the chip system further includes a memory. The memory is configured to store program instructions and data that are necessary for a network device. The chip system may include a chip, or may include a chip and another discrete device.

According to a twelfth aspect, this application provides a chip system. The chip system includes a processor and an interface, configured to support a network device in implementing a function in the third aspect or the fourth aspect, for example, determining or processing at least one of data or information in the foregoing method. In a possible design, the chip system further includes a memory. The memory is configured to store program instructions and data that are necessary for the network device. The chip system may include a chip, or may include a chip and another discrete device.

DESCRIPTION OF EMBODIMENTS

The following describes technical solutions in this application with reference to the accompanying drawings.

The technical solutions in this application may be specifically applied to various communication systems. For example, with the continuous development of communication technologies, the technical solutions in this application may be further applied to a future network, for example, a 5G system, which may also be referred to as a new radio (new radio, NR) system; or may be applied to a device-to-device (device-to-device, D2D) system or a machine-to-machine (machine-to-machine, M2M) system.

Figure 1:
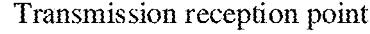
FIG. 1 is a schematic diagram of a structure of a communication system according to an embodiment of this application.
Figure 1:
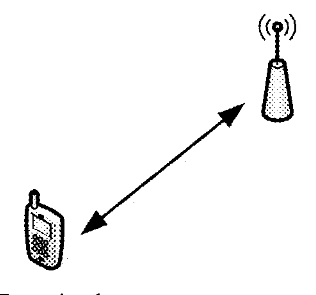

FIG. 1 is a schematic diagram of a structure of a communication system according to an embodiment of this application. The communication system may include but is not limited to one network device and one terminal device. A quantity of devices and forms of the devices shown in FIG. 1 are used as examples, but do not constitute a limitation on this embodiment of this application. During actual application, the communication system may include two or more network devices and two or more terminal devices. The communication system shown in FIG. 1 is described by using an example in which there is one network device, and the network device can provide a terminal device with repeated transmission through a downlink control channel. In FIG. 1, for example, the network device is a transmission reception point TRP, and the terminal device is a mobile phone.

Figure 2:
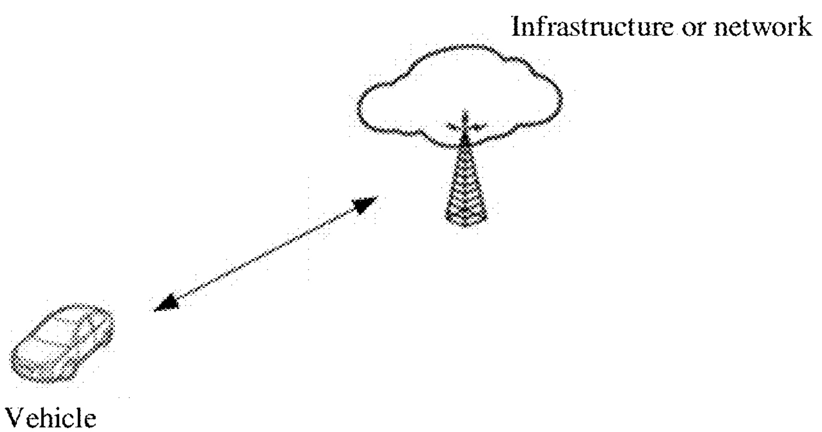
FIG. 2 is a schematic diagram of a structure of a V2N system according to an embodiment of this application.

This application may be further applied to vehicle-to-everything such as vehicle-to-network (vehicle-to-network, V2N) communication. In other words, the terminal in this application may alternatively be a vehicle or a vehicle component applied to the vehicle. FIG. 2 is a schematic diagram of a structure of a V2N system according to an embodiment of this application. As shown in FIG. 2, a roadside infrastructure may include a road side unit (road side unit, RSU) of a network device type. The RSU of the network device type may provide a vehicle or a vehicle component that communicates with a network device with timing synchronization, resource scheduling, repeated transmission through a downlink control channel, and the like.

The network architecture and service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

In this application, the network device may be a device that has a wireless transceiver function or a chip that can be disposed in the network device. The network device includes but is not limited to: an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission and reception point, TRP, or transmission point, TP), and the like; may be a gNB or a transmission point (TRP or TP) in a 5G system such as an NR system, one antenna panel or one group of antenna panels (including a plurality of antenna panels) of a base station in the 5G system; or may be a network node forming a gNB or a transmission point, for example, a BBU or a distributed unit (DU, distributed unit), a network device or the RSU of the network device type in V2X vehicle-to-everything.

In some deployments, the gNB or the transmission point may include a centralized unit (centralized unit, CU) and a DU. The gNB may further include a radio unit (radio unit, RU). The CU implements some functions of the gNB or the transmission point, and the DU implements some functions of the gNB or the transmission point. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Information at the RRC layer eventually becomes information at the PHY layer, or is converted from the information at the PHY layer. Therefore, in the architecture, higher layer signaling such as RRC layer signaling or PHCP layer signaling may also be considered as being sent by the DU or sent by the DU and the RU. It may be understood that the network device may be a CU node, a DU node, or a device including the CU node and the DU node. In addition, the CU may be classified as a network device in an access network RAN, or the CU may be classified as a network device in a core network CN. This is not limited herein.

In this application, the terminal device may also be referred to as user equipment (user equipment, UE), an access terminal, a subscriber unit, a subscriber station, a mobile station, a remote station, a remote terminal, a mobile device, a user terminal, a wireless communication device, a user agent, or a user apparatus. The terminal device in embodiments of this application may be a mobile phone (mobile phone), a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a wireless terminal or an RSU of a wireless terminal type in V2X vehicle-to-everything, or the like. An application scenario is not limited in embodiments of this application.

In addition, the term "for example" in embodiments of this application is used to represent giving an example, an illustration, or a description. Any embodiment or design scheme described as an "example" in this application should not be explained as being more preferred or having more advantages than another embodiment or design scheme. Exactly, the term "for example" is used to present a concept in a specific manner.

In embodiments of this application, "of (of)", "relevant (relevant)", "associated", and "corresponding (corresponding)" may be interchangeably used sometimes. It should be noted that meanings expressed by the terms are consistent when differences are not emphasized. In embodiments of this application, "at least one" may also be described as "one or more", and "a plurality of" may be "two, three, four, or more". This is not limited in this application. In embodiments of this application, "first", "second", "third", "A", "B", "C", "D", and the like are used for distinguishing between technical features described by them. There is no chronological order or no size order between the technical features described by "first", "second", "third", "A", "B", "C", and "D".

For ease of understanding related content in embodiments of this application, the following describes some concepts related to embodiments of this application.

1. A Plurality of Search Spaces

A plurality of search spaces described in this specification may be search spaces having an association relationship, for example, search spaces for repeated transmission through a same downlink control channel, search spaces that determine one uplink control channel resource indicator PRI, or search spaces for jointly transmitting same downlink control information.

In a possible implementation, there is one uplink control channel resource indicator PRI determined by the plurality of search spaces. For example, one piece of downlink control information is jointly transmitted in the plurality of search spaces, and a terminal device needs to monitor a downlink control channel carried in all of the search spaces to obtain the downlink control information.

In another possible implementation, the plurality of search spaces are search spaces for repeated transmission through a same downlink control channel or for repeated transmitting same downlink control information. To be specific, in a scenario of repeated transmission through a downlink control channel, repeated transmission through the downlink control channel may be performed in time domain, frequency domain, time-frequency domain, or code domain, to improve reliability of the downlink control channel. In embodiments of this application, downlink control channels for repeated transmission may have different channel features or parameters in time domain, frequency domain, time-frequency domain, or code domain. For example, the downlink control channels use different bit rates, but carry same downlink control information (downlink control information, DCI).

Figure 3:
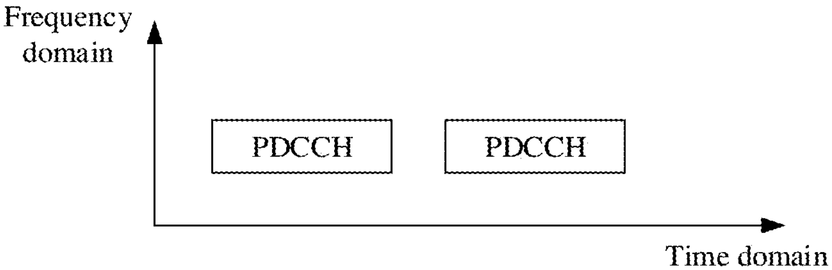
FIG. 3 is a schematic diagram of repeated transmission through a PDCCH according to an embodiment of this application.

For example, FIG. 3 is a schematic diagram of repeated transmission through a PDCCH according to an embodiment of this application. As shown in FIG. 3, repeated transmission through a physical downlink control channel (physical downlink control channel, PDCCH) may be performed on two time domain resources. PDCCHs for repeated transmission on each time domain resource may have different channel features or parameters, but carry same downlink control information.

Figure 4:
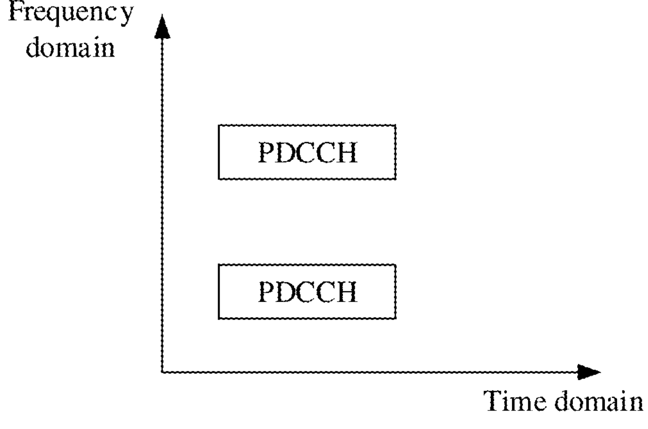
FIG. 4 is another schematic diagram of repeated transmission through a PDCCH according to an embodiment of this application.

For another example, FIG. 4 is another schematic diagram of repeated transmission through a PDCCH according to an embodiment of this application. As shown in FIG. 4, repeated transmission through a physical downlink control channel (physical downlink control channel, PDCCH) may be performed on two frequency domain resources. PDCCHs for repeated transmission on each frequency domain resource may have different channel features or parameters, but carry same downlink control information.

2. Uplink Control Channel Resource

The terminal device may feed back uplink control information on an uplink control channel resource. The uplink control information includes hybrid automatic repeat request (hybrid automatic repeat request, HARQ)-acknowledgment (ACK) information, channel state information (channel state information, CSI), and the like.

The uplink control channel resource may be determined based on a higher layer parameter and downlink control information.

In an implementation, the terminal device selects a corresponding uplink control channel resource set from an uplink control channel resource pool based on a quantity of bits of the uplink control information. The terminal device determines the uplink control channel resource from the uplink control channel resource set based on an uplink control channel resource indicator in the downlink control information.

The uplink control channel resource pool is configured for the terminal device using the higher layer parameter or higher layer signaling such as RRC signaling. The uplink control channel resource pool includes a plurality of uplink control channel resource sets. Different uplink control channel resource sets correspond to different bit intervals of the uplink control information.

The uplink control channel resource indicator is a physical uplink control channel resource indicator (PUCCH resource indicator, PRI). The PRI in the DCI occupies three bits. When there are less than eight uplink control channel resources in the uplink control channel resource set, the PRI may be used to indicate a maximum of eight uplink control channel resources.

In another implementation, the uplink control channel resource set in the uplink control channel resource pool may include more than eight uplink control channel resources, for example, include 32 uplink control channel resources, which cannot be completely indicated using only the PRI. Therefore, for the uplink control channel resource set including more than eight uplink control channel resources, the uplink control channel resource further needs to be determined from the uplink control channel resource set based on a control channel element (control channel element, CCE) start location of a search space carrying the DCI.

As described in the foregoing two implementations, a resource number $r_{PUCCH}$ of the uplink control channel resource determined by the terminal device based on resource indication information in the DCI and the CCE start location may be determined according to the following formula:

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

mod represents a modulo operation; $N_{CCE,p}$ is a total quantity of CCEs in a control resource set (CORESET) to which the DCI belongs, and is configured using higher layer signaling; $n_{CCE,p}$ is a CCE start location occupied by a PDCCH carrying the DCI or a CCE location (for example, the CCE start location) of the search space carrying the DCI; $\Delta_{PR1}$ is the resource indicator information (for example, the PRI) in the DCI; $R_{PUCCH}$ is a total quantity of PUCCH resources allocated to a CORESET group to which the CORESET belongs.

3. Control Channel Element (Control Channel Element, CCE)

A basic composition unit of a time-frequency resource occupied by a PDCCH is a CCE. One PDCCH occupies one or more CCEs. A larger quantity of occupied CCEs indicates higher reliability of the PDCCH and more consumed resources. If a user-specific or terminal device-specific PDCCH occupies some CCEs, the some CCEs do not carry a PDCCH of another user or terminal device.

The CCE includes six resource element groups (resource element groups, REGs). A resource of one REG includes one resource block (resource block, RB) in frequency domain and one symbol in time domain. There is a mapping relationship between the CCE and the REG, and the mapping relationship may be direct mapping or interleave mapping. Six consecutive REGs may constitute one CCE, and six inconsecutive REGs may be interleaved and then mapped to one CCE.

4. Control Resource Set and Search Space Group

A control resource set (control resource set, CORESET) defines a possibility of monitoring frequency domain information of a PDCCH. A network side may configure, for the terminal device, information such as an identifier of the CORESET, an ID for scrambling a DMRS of the PDCCH, a frequency domain precoding granularity, a symbol length, a frequency domain location, a mapping manner between a CCE and a REG, a quasi co-location assumption for receiving the PDCCH, and whether DCI of the PDCCH received in the CORESET includes a TCI field.

A search space group (search space set, SS set) defines a possibility of monitoring time domain information of a PDCCH. The network side may configure, for the terminal device, an identifier of the SS set, an identifier of a CORESET associated with the SS set, a detection time unit periodicity and a time unit offset of the PDCCH, a time domain detection pattern (pattern), a quantity (for example, 0) of possible PDCCH candidates (PDCCH candidates) at each aggregation level, a type of the SS set (indicating whether the SS set is public or terminal device-specific, where “public” indicates that another user may detect the SS set, and “terminal device-specific” indicates that no other user can detect the SS set), configuration related to a DCI format (for example, a possibility of a format of to-be-monitored DCI), a consecutive length, and the like.

In addition, a search space set described below is a set including one or more search spaces determined by the terminal device based on a search space group and a control resource set that are configured on the network device side. That is, the search space set described in this specification is different from a concept of the search space group.

The time domain detection pattern indicates a symbol location at which the terminal device may detect the PDCCH in one slot. For example, the time domain detection pattern may indicate one or more symbol locations. These symbol locations respectively correspond to the first symbol locations at which possible PDCCHs start to be detected. For example, if the time domain detection pattern may indicate symbol locations 11, 12, and 13, the terminal device may detect the PDCCHs respectively at the locations where the symbol 11, the symbol 12, and the symbol 13 are used as start symbols.

The quantity of possible PDCCH candidates at each aggregation level is a quantity of possible PDCCH candidates at each aggregation level in one search space, for example, a quantity of possible PDCCH candidates at an aggregation level 1, or a quantity of possible PDCCH candidates at an aggregation level 2.

The consecutive length is duration of the SS set configured by the network side for the terminal device in a time domain time unit. For example, the time domain time unit is a slot, and the consecutive length is d. This indicates that d consecutive slots starting from one slot may be used for monitoring the PDCCH. The start slot is a slot that meets the detection time unit periodicity and the time unit offset.

5. Blind Detection Process of the Terminal Device

Figure 5:
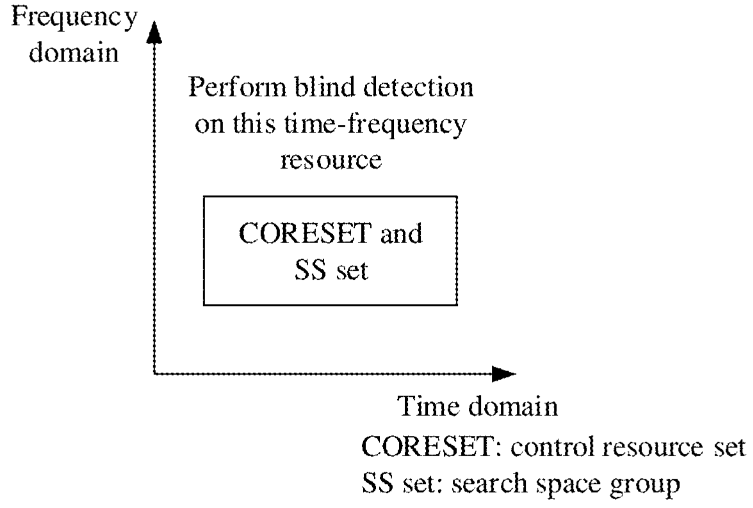
FIG. 5 is a schematic diagram of a time-frequency resource determined based on a CORESET and an SS set according to an embodiment of this application.

The terminal device may determine a time-frequency resource based on the information described in the point 4 in the foregoing concept description, such as the control resource set (CORESET) and the search space group (search space set, SS set). Refer to FIG. 5. A time-frequency resource shown in FIG. 5 is determined based on a control resource set M and a search space group O, where M represents an identifier of the control resource set, and O represents an identifier of the search space group. The time-frequency resource includes a plurality of CCEs. One search space includes/CCEs on the time-frequency resource, and/represents an aggregation level. Therefore, the terminal device may determine a plurality of search spaces based on a CORESET and an SS set, and the terminal device blindly monitors each search space to receive downlink control information.

A CCE start location of one search space is related to an aggregation level l. For example, an identifier or an index number of a start CCE is an integer multiple of l. The CORESET is for determining a frequency domain range and a duration symbol time in time domain, and the SS set is for determining a start symbol location in time domain. The search space indicates a time domain resource on which the terminal device may detect a PDCCH.

It can be learned that CCE locations of the search spaces are different when same downlink control information is jointly transmitted or repeatedly transmitted in a plurality of search spaces, or a same PRI is determined by the plurality of search spaces. When an uplink control channel resource is determined according to the foregoing formula, and a quantity of uplink control channel resources in an uplink control channel resource set is greater than 8, the uplink control channel resource cannot be uniquely determined according to the foregoing formula.

For example, in a scenario of repeated transmission through a downlink control channel, as shown in FIG. 3 and FIG. 4, the terminal device may detect PDCCHs in the plurality of search spaces, and the detected PDCCHs carry same DCI. However, for the terminal device, in the scenario of repeated transmission through the downlink control channel, the terminal device does not need to detect PDCCHs in all of the search spaces, and only needs to correctly detect a PDCCH in one of the search spaces.

For example, in a high-frequency transmission scenario, because a channel blocking rate is high, a probability that the terminal device can detect all of the PDCCHs is lower, and some PDCCHs may be missed out. Because DCI of PDCCHs for repeated transmission is the same, that is, PRIs are the same, but search spaces carrying the DCI are different, that is, CCE locations are different, CCE start locations determined by the terminal device are different because of different search spaces in which PDCCHs are detected. Consequently, when the quantity of uplink control channel resources in the uplink control channel resource set is greater than 8, the uplink control channel resource cannot be uniquely determined according to the foregoing formula.

To resolve the problem, this application provides a resource determining method. In the method, a terminal device may select, from a plurality of search spaces, a search space that meets a preset condition, to determine an uplink control channel resource based on a control channel element CCE start location of the search space that meets the preset condition. It can be learned that, according to the resource determining method, the search space that meets the preset condition can be selected from the plurality of search spaces, so that a unique uplink control channel resource can be determined.

This application further provides a channel transmission method. In the method, in a plurality of search spaces, ratios of CCE start locations of the search spaces to a quantity of CCEs in a control resource set corresponding to the search spaces are all equal. Therefore, it can be learned from the foregoing formula that, a unique uplink control channel resource may be determined based on a control channel element CCE location of a search space in which one of downlink control channels is detected, and then an uplink control channel is sent on the uplink control channel resource.

The following describes embodiments of this application with reference to the accompanying drawings.

Figures 6, 7:
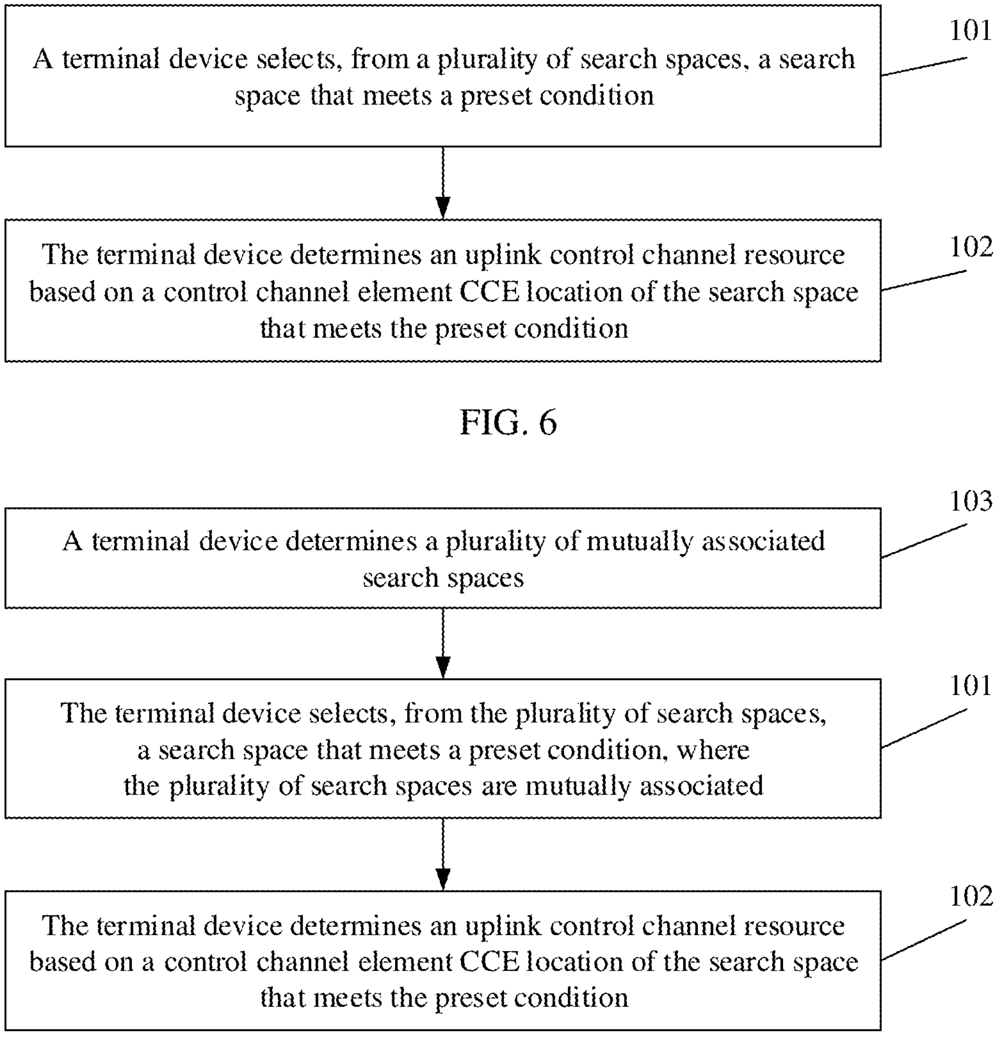
FIG. 6 is a schematic flowchart of a resource determining method according to an embodiment of this application.
FIG. 7 is a schematic flowchart of another resource determining method according to an embodiment of this application.

FIG. 6 is a schematic flowchart of a resource determining method according to an embodiment of this application. As shown in FIG. 6, the resource determining method may include the following steps.

101: A terminal device selects, from a plurality of search spaces, a search space that meets a preset condition.

The plurality of search spaces are search spaces having an association relationship, for example, search spaces for repeated transmission through a same downlink control channel, search spaces that determine one uplink control channel resource indicator PRI, or search spaces for jointly transmitting same downlink control information.

102: The terminal device determines an uplink control channel resource based on a CCE location, for example, a control channel element CCE start location, of the search space that meets the preset condition.

It can be learned that, according to the resource determining method shown in FIG. 6, a unique uplink control channel resource may be determined based on a control channel element CCE location of a search space in which the downlink control channel is detected.

The plurality of search spaces in FIG. 6 may be determined based on one or more control resource sets associated with a search space group, may be determined based on a plurality of search space groups associated with one control resource set, may be determined based on an offset offset value configured using signaling, may be configured on a network side or protocol-predefined, or may be determined based on a related parameter configured on the network side. Optionally, the plurality of determined search spaces may be a plurality of associated or mutually associated search spaces that are configured by a network device in an optional implementation. Therefore, compared with the resource determining method shown in FIG. 6, the method in FIG. 7 may further include the following steps before the terminal device performs step 101.

103: The terminal device determines a plurality of mutually associated search spaces.

In other words, the terminal device determines, based on the search space in which the downlink control channel is detected, a search space associated with the search space in which the downlink control channel is detected, to obtain the plurality of mutually associated search spaces. In other words, the search space in which the downlink control channel is detected is one of the plurality of mutually associated search spaces.

Correspondingly, the network device may also perform step 101 and step 102, to receive uplink control information based on the determined uplink control channel resource. Optionally, the network device may further perform the operation of determining the plurality of mutually associated search spaces in step 103.

The following describes possible implementations of step 103 and step 101 from the perspective of the terminal device based on an association relationship that may be configured by the network device. It should be noted that this embodiment of this application includes but is not limited to the following implementations 1 to 4.

Implementation 1: One SS set is associated with a plurality of CORESETs.

In this implementation, the network device configures, for the terminal device, one SS set and a plurality of CORESETs associated with the SS set. Step 103 may include: The terminal device determines a plurality of mutually associated search spaces based on the SS set and the plurality of CORESETs associated with the SS set.

Optionally, the plurality of CORESETs belong to different control resource set groups (CORESET groups) or different control resource pool indexes (CORESET pool indexes). Correspondingly, the CORESET groups or the CORESET pool indexes to which the plurality of CORESETs respectively belong are determined based on a CORESET group identifier or a CORESET pool index in each CORESET. The CORESET group identifier may be a default value, or may be 0, 1, or the like. When the CORESET group identifier is a default value, the identifier may be 0 by default.

Figure 8:
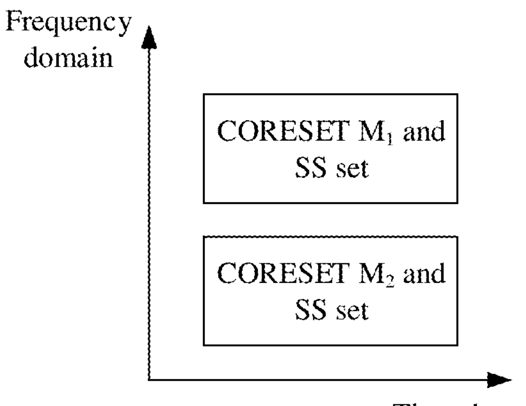
FIG. 8 is a schematic diagram of time-frequency resources respectively determined based on a CORESET $M_1$ and an SS set and based on a CORESET $M_1$ and the SS set according to an embodiment of this application.

In a possible implementation method, it is assumed that one search space group is associated with two control resource sets: a control resource set $M_1$ and a control resource set $M_2$. For example, a time-frequency resource including the search space group and the control resource set $M_1$ and a time-frequency resource including the search space group and the control resource set $M_2$ are shown in FIG. 8. A search space included in the time-frequency resource including the search space group and the control resource set $M_1$ belongs to a first search space set, and a search space included in the time-frequency resource including the search space group and the control resource set $M_2$ belongs to a second search space set.

Figure 9:
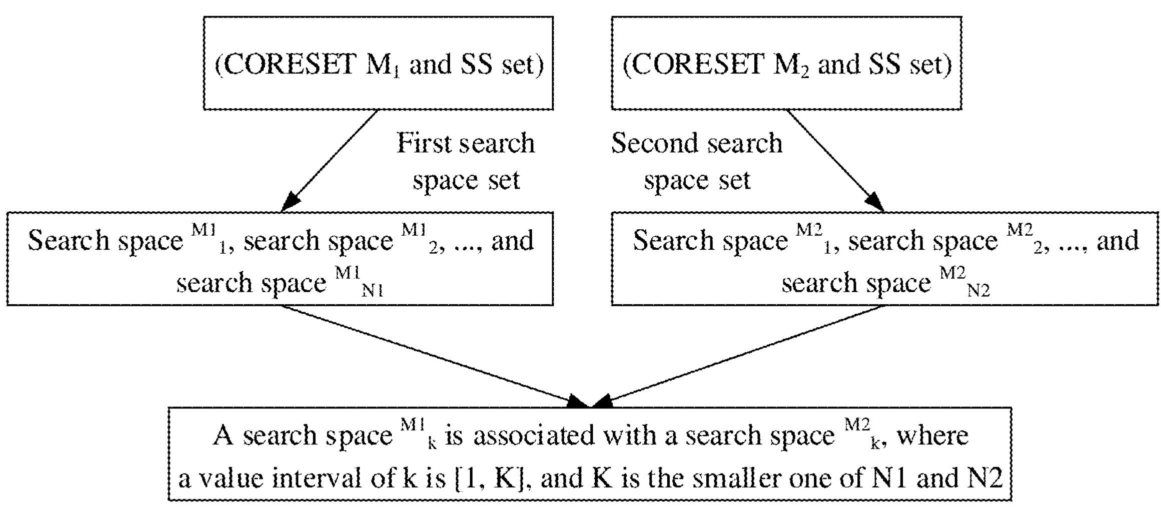
FIG. 9 is a schematic diagram of a method for determining a plurality of mutually associated search spaces according to an embodiment of this application.

As shown in FIG. 9, that the terminal device determines a plurality of associated search spaces based on the search space group and a plurality of control resource sets associated with the search space group in step 103 includes the following steps.

1031: The terminal device determines the first search space set based on the search space group and the control resource set $M_1$, where the first search space set includes a search space $M1_1$, a search space $M1_2$, . . . , and a search space $M1_{N1}$.

1032: The terminal device determines the second search space set based on the search space group and the control resource set $M_2$, where the second search space set includes a search space M21, a search space $M2_2$, . . . , and a search space $M2_{N2}$.

1033: The terminal device determines that there is a one-to-one association relationship between the first K search spaces in the first search space set and the first K search spaces in the second search space set. That is, a search space $M1_k$ is associated with a search space $M2_k$, where a value interval of k is [1, K], and K is the smaller one of N1 and N2.

N1 represents a quantity of search spaces in the first search space set, and N2 represents a quantity of search spaces in the first search space set. N1 may be equal to or not equal to N2. The terminal device determines that there is a one-to-one association relationship between the first K search spaces in the first search space set and the first K search spaces in the second search space set. That is, the search space $M1_k$ is associated with the search space $M2_k$, where the value interval of k is [1, K], and K is the smaller one of N1 and N2.

Optionally, in 1033, the terminal device may further determine mutually associated search spaces based on a predefinition in a protocol. For example, it is protocol-predefined that there is a one-to-one, one-to-many, or many-to-one association relationship between the last K search spaces in the first search space set and the last K search spaces in the second search space set. For another example, there is a one-to-one, one-to-many, or many-to-one association relationship between K search spaces selected from the first search space set and K search spaces selected from the second search space set. For still another example, the first search space set includes a plurality of aggregation levels, the second search space set includes a plurality of aggregation levels. In this case, a plurality of search spaces that are respectively from the two search space sets and that correspond to a same aggregation level are mutually associated.

In another possible implementation method, assuming that one search space group is associated with three control resource sets, an implementation method similar to the foregoing implementation method may be used to determine that every three search spaces are associated. Same downlink control information may be repeatedly transmitted in the three associated search spaces.

In this implementation, identifiers of control resource sets corresponding to mutually associated search spaces are different, and the preset condition may be that an identifier of a corresponding control resource set is smallest or largest. In this way, in step 101, the terminal device may select, from the plurality of mutually associated search spaces, the search space that meets the preset condition, to determine the uplink control channel resource. For example, the search space $M1_k$ is associated with the search space $M2_k$. If M1 is greater than M2, and the preset condition is that an identifier of a corresponding control resource set is smallest, the search space that meets the preset condition is the search space $M2_k$.

Optionally, in this implementation, that the terminal device may select, from the plurality of mutually associated search spaces, the search space that meets the preset condition in step 101 may be: The terminal device selects, from the plurality of mutually associated search spaces, a search space that occupies smallest or largest CCE start location. For example, the search space $M1_k$ is associated with the search space $M2_k$. If a CCE start location occupied by the search space $M1_k$ is less than a CCE start location occupied by the search space $M2_k$, the selected search space may be the search space $M1_k$ that occupies a smaller CCE start location.

Implementation 2: Each of N SS sets is associated with M CORESETs, where N is greater than or equal to 1, and M is greater than or equal to 1.

In this implementation, the network device may configure, for the terminal device, N SS sets and M CORESETs associated with each of the N SS sets. Correspondingly, step 103 may include: The terminal device may determine a plurality of mutually associated search spaces based on the SS set and the CORESETs associated with the SS set.

Figure 10:
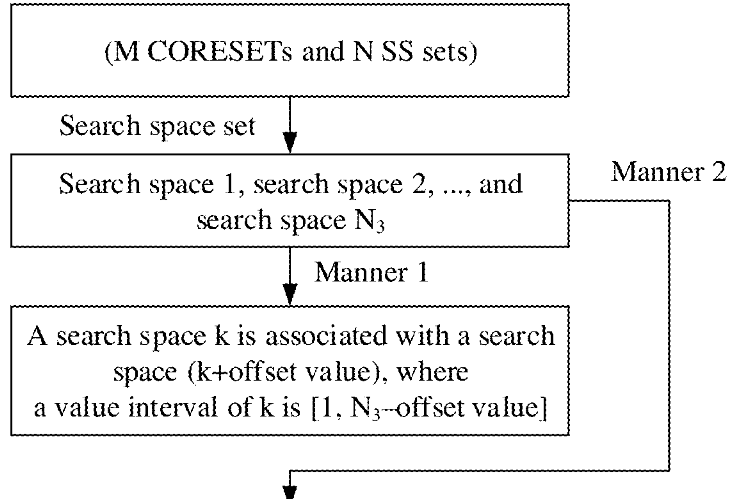
FIG. 10 is a schematic diagram of another method for determining a plurality of mutually associated search spaces according to an embodiment of this application.

In a possible implementation method, as shown in FIG. 10, that the terminal device may determine a plurality of mutually associated search spaces based on the SS set and the CORESETs associated with the SS set may include the following steps.

1034: The terminal device determines one search space set based on the N SS sets and the M CORESETs.

1035: The terminal device sorts the search space set in ascending order of aggregation levels and/or CCE start locations of the search spaces, to obtain a search space 1, a search space 2, . . . , and a search space N3.

1036: The terminal device determines the plurality of mutually associated search spaces from the search space set based on the offset offset value configured using signaling.

In a possible implementation method, in step 1035, the search spaces in the search space set are sorted, and the search space set may be preferentially divided, based on aggregation levels, into search space subsets corresponding to the aggregation levels. Search spaces in each search space subset have a same aggregation level. In step 1036, the terminal device may determine the plurality of mutually associated search spaces from a same search space subset based on the offset offset value configured using signaling. In this implementation, the mutually associated search spaces are determined from search space subsets corresponding to a same aggregation level. Therefore, a value range of the offset offset value may be reduced, thereby reducing bit overheads of the offset value.

In another possible implementation method, step 1035 may be: The terminal device sorts the search spaces in the search space set according to a specific rule. The specific rule may be: sorting the search spaces based on one or more of occupied CCE start locations, identifier IDs of corresponding search space groups, identifiers of corresponding control resource sets, or corresponding aggregation levels. The following describes optional sorting manners by using examples.

For example, in step 1035, when the search spaces in the search space set are sorted, the search spaces may be preferentially sorted based on aggregation levels, and then search spaces corresponding to a same aggregation level are sorted based on CCE locations. The CCE location may be the CCE start location. Further, in step 1036, the plurality of mutually associated search spaces may be determined from a sorted search space set.

For another example, in step 1035, the search spaces in the search space set are sorted. The search spaces may be preferentially sorted based on identifiers of corresponding control resource sets (for example, in descending order or in ascending order), then may be sorted based on identifiers of corresponding search space groups (for example, in descending order or in ascending order), and finally may be sorted based on corresponding aggregation levels or occupied CCE locations. Further, in step 1036, the plurality of mutually associated search spaces may be determined from a sorted search space set. For example, in Manner 1, a search space k is associated with a search space (k+offset value), where a value interval of k is [1, $N_3$−offset value]. For example, a search space 1 is associated with a search space (1+offset value).

Alternatively, in Manner 2, a search spaces k, a search space (k+offset value), . . . , and a search space (k+offset value*x) are mutually associated, where x is an integer greater than 1, (k+offset value*x) is less than or equal to N3, and a value interval of k is [1, offset value*x]. For example, k=1, and x=2. The search space 1, the search space (1+offset value), and a search space (1+offset value*2) are mutually associated.

Optionally, after the plurality of mutually associated search spaces are determined in the foregoing implementations, one search space that meets the following preset condition may be selected from the plurality of mutually associated search spaces, to determine the uplink control channel resource. The preset condition may include one or more of the following: an identifier of a corresponding control resource set is smallest or largest; an identifier of a corresponding search space group is smallest or largest; a corresponding aggregation level is lowest or highest; an identifier of a CCE start location is smallest or largest; or an identifier of a corresponding control resource set group is smallest or largest. For example, the search space 1 is associated with the search space (1+offset value), and the preset condition is that an identifier of a CCE start location is smallest. In this case, assuming that a CCE start location occupied by the search space 1 is less than a CCE start location occupied by the search space (1+offset value), the search space that meets the preset condition is the search space 1.

In this specification, a size of the CCE start location or a CCE end location may be a size of an identifier of the CCE start location or a size of an identifier of the CCE end location.

Implementation 3: One CORESET is associated with a plurality of SS sets.

In this implementation, the network device configures a plurality of CORESETs for the terminal device, and associates one of the CORESETs with a plurality of SS sets. Step 103 may include: The terminal device determines the plurality of mutually associated search spaces based on the CORESET and the plurality of SS sets associated with the CORESET.

Figure 11:
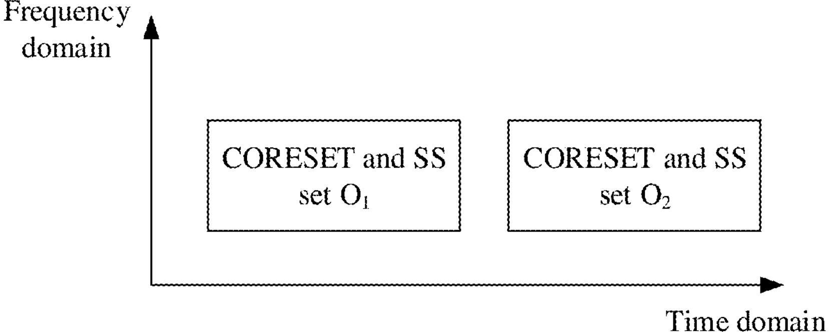
FIG. 11 is a schematic diagram of time-frequency resources respectively determined based on an SS set $O_1$ and a CORESET and based on an SS set $O_2$ and the CORESET according to an embodiment of this application.

In a possible implementation method, it is assumed that two search space groups are associated with one control resource set, and the two search space groups are an SS set $O_1$ and an SS set $O_2$. For example, a time-frequency resource including the search space group $O_1$ and the control resource set and a time-frequency resource including the search space group $O_2$ and the control resource set are shown in FIG. 11. A search space included in the time-frequency resource including the search space group $O_1$ and the control resource set belongs to a third search space set, and a search space included in the time-frequency resource including the search space group $O_2$ and the control resource set belongs to a fourth search space set.

Figure 12:
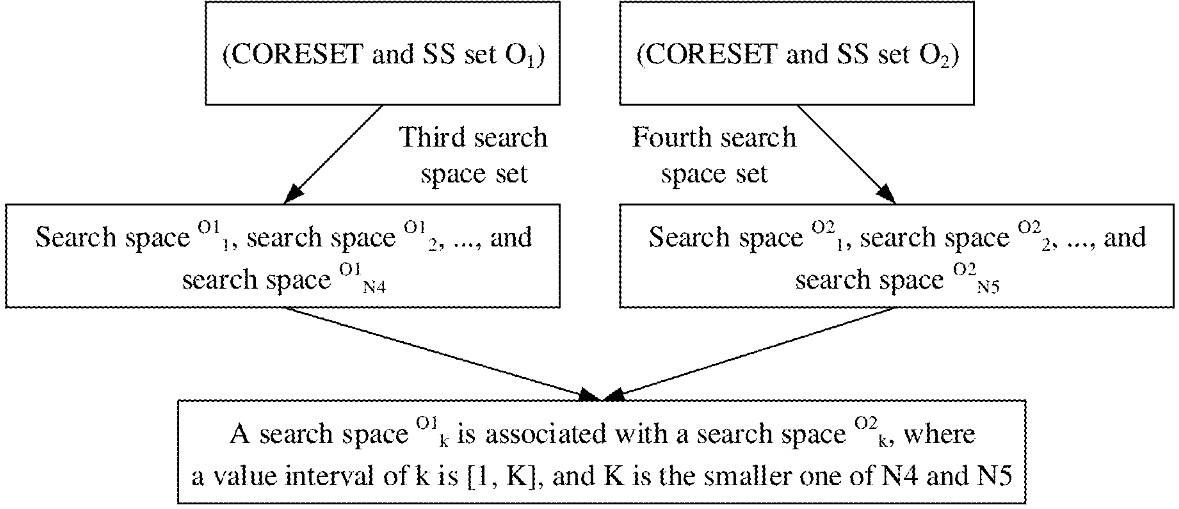
FIG. 12 is a schematic diagram of still another method for determining a plurality of mutually associated search spaces according to an embodiment of this application.

Correspondingly, as shown in FIG. 12, that the terminal device may determine the plurality of mutually associated search spaces based on the CORESET and the plurality of SS sets associated with the CORESET includes the following steps.

1037: The terminal device determines the third search space set based on the SS set $O_1$ and the CORESET, where the third search space set includes a search space $O1_1$, a search space $O1_2$, . . . , and a search space $O1_{N4}$.

1038: The terminal device determines the fourth search space set based on the SS set $O_2$ and the CORESET, where the fourth search space set includes a search space $O2_1$, a search space $O2_2$, and a search space $O2_{N5}$.

1039: The terminal device determines that there is a one-to-one association relationship between the first K search spaces in the third search space set and the first K search spaces in the fourth search space set. That is, a search space $O1_k$ is associated with a search space $O2_k$, where a value interval of k is [1, K], and K is the smaller one of N4 and N5.

N4 represents a quantity of search spaces in the third search space set, and N5 represents a quantity of search spaces in the fourth search space set. N4 may be equal to or not equal to N5.

For an optional implementation of step 1039, refer to related descriptions of step 1033 in Implementation 1. Details are not described herein again.

In another possible implementation method, assuming that the network device configures three search space groups to be associated with one control resource set, an implementation method similar to the foregoing implementation method may be used to determine that every three search spaces are associated. Same downlink control information may be repeatedly transmitted in the three associated search spaces.

In this implementation, identifiers of search space groups corresponding to mutually associated search spaces are different, and the preset condition may be that an identifier of a corresponding search space group is smallest or largest. In this way, the terminal device may select, from the plurality of mutually associated search spaces, the search space that meets the preset condition, to determine the uplink control channel resource. For example, the search space $O1_k$ is associated with the search space $O2_k$. If O1 is greater than O2, and the preset condition is that an identifier of a corresponding search space group is smallest, the search space that meets the preset condition is the search space $O2_k$.

Implementation 4: For the plurality of search space sets determined in Implementations 1 and 3, associated search spaces may be further determined from the plurality of search space sets with reference to aggregation levels.

In an implementation method, that the terminal device determines a plurality of mutually associated search spaces based on a control resource set, and an SS set $O_1$ and an SS set $O_2$ that are associated with the control resource set includes:

The terminal device determines, based on the SS set $O_1$ and the control resource set, search spaces corresponding to an aggregation level l in the third search space set are respectively {a search space $l^{O1}{}_1$, a search space $l^{O1}{}_2$, . . . , a search space $l^{O1}{}_{N6}$}, where N6 is less than or equal to N4.

The terminal device determines, based on the SS set $O_2$ and the control resource set, search spaces corresponding to the aggregation level l in the fourth search space set are respectively {a search space $l^{O2}{}_1$, a search space $l^{O2}{}_2$, . . . , a search space $l^{O2}{}_{N7}$}, where N7 is less than or equal to N5.

N6 may be equal to or not equal to N7. An association relationship between search spaces is protocol-predefined or configured using signaling: A search space $l^{O1}{}_k$ is associated with a search space $l^{O2}{}_k$, where a value interval of k is [1, K], K is the smaller one of N6 and N7, and l represents an aggregation level corresponding to the search space.

In another implementation method, that the terminal device determines the plurality of mutually associated search spaces based on a search space group, and a CORESET $M_1$ and a CORESET $M_2$ that are associated with the search space group includes:

The terminal device determines, based on the CORESET $M_1$ and the search space group, that search spaces corresponding to an aggregation level 1 in the first search space set are respectively {a search space $l^{M1}{}_1$, a search space $l^{M1}{}_2$, . . . , a search space $l^{M1}{}_{N}8$}, where N8 is less than or equal to N1.

The terminal device determines, based on the CORESET $M_2$ and the search space group, that search spaces corresponding to the aggregation level 1 in the second search space set are respectively {a search space $l^{M2}{}_1$, a search space $l^{M2}{}_2$, . . . , a search space $l^{M2}{}_{N9}$}, where N9 is less than or equal to N2.

N8 may be equal to or not equal to N9. An association relationship between search spaces is protocol-predefined or configured using signaling: A search space $l^{M1}{}_k$ is associated with a search space $l^{M2}{}_k$, where a value interval of k is [1, K], K is the smaller one of N8 and N9, and l represents an aggregation level corresponding to the search space.

Figure 13:
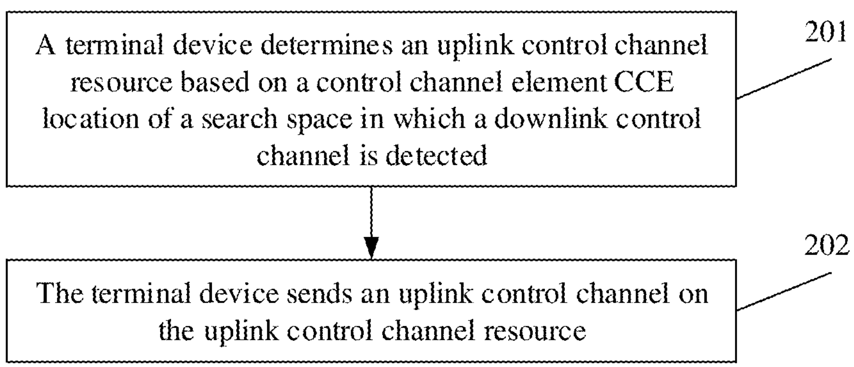
FIG. 13 is a schematic flowchart of a channel transmission method according to an embodiment of this application.

FIG. 13 is a schematic flowchart of a channel transmission method according to an embodiment of this application. In the channel transmission method shown in FIG. 13, a plurality of mutually associated search spaces are limited to some extent, so that a terminal device can uniquely determine an uplink control channel resource. Specifically, as shown in FIG. 13, the method includes the following steps.

201: The terminal device determines an uplink control channel resource based on a control channel element CCE location of a search space in which a downlink control channel is detected.

The search space in which the downlink control channel is detected is one of a plurality of search spaces. The plurality of search spaces are search spaces having an association relationship, for example, search spaces for repeated transmission through the same downlink control channel, search spaces that determine one uplink control channel resource indicator PRI, or search spaces for jointly transmitting same downlink control information. In the plurality of search spaces, ratios of CCE locations (for example, CCE start locations) of the search spaces to a quantity of CCEs in a control resource set corresponding to the search spaces are all equal. In other words, for all of the plurality of search spaces, ratios of CCE locations of the search spaces to a quantity of CCEs in a control resource set corresponding to the search spaces are all equal.

In this specification, the CCE location may be a start identifier of an identifier corresponding to a CCE, or the CCE start location may be an identifier corresponding to the CCE or a start identifier of the CCE.

202: The terminal device sends an uplink control channel on the uplink control channel resource.

Correspondingly, before the terminal device performs step 201, a network device may determine a plurality of search spaces, and in the plurality of search spaces, ratios of CCE locations (for example, CCE start locations) of the search spaces to a quantity of CCEs in a control resource set corresponding to the search spaces are all equal. In this way, the network device may jointly send same downlink control information or perform repeated sending through a same downlink control channel in the plurality of search spaces.

In other words, for a terminal device side, regardless of a scenario of repeated transmission through a downlink control channel, a scenario of jointly transmitting same downlink control information in a plurality of search spaces, or a scenario in which a same PRI is determined by a plurality of search spaces, the terminal device may determine an uplink control channel resource based on a search space in which the downlink control channel is detected. For a network device side, in the foregoing optional scenario, in a plurality of search spaces used by the network device to send the downlink control channel of the downlink control information, ratios of CCE start locations occupied by the search spaces to a quantity of CCEs in a control resource set corresponding to the search spaces are equal.

In an implementation, the terminal device does not expect that, in a plurality of received search spaces that are associated, ratios of CCE start locations occupied by the search spaces to a quantity of CCEs in a control resource set corresponding to the search spaces are unequal. Alternatively, the terminal device expects that, in a plurality of received search spaces that are associated, ratios of CCE start locations occupied by the search spaces to a quantity of CCEs in a control resource set corresponding to the search spaces are equal. Alternatively, in a plurality of associated search spaces delivered by the network device, ratios of CCE start locations occupied by the search spaces to a quantity of CCEs in a control resource set corresponding to the search spaces are equal.

In this embodiment of this application, the network device may preconfigure a plurality of associated search spaces for the terminal device, or notify, in a protocol-predefined manner, the terminal device of the plurality of associated search spaces. In the plurality of associated search spaces, ratios of CCE start locations occupied by the search spaces to a quantity of CCEs in a control resource set corresponding to the search spaces are equal.

For example, when an uplink shared channel resource or an index of the uplink shared channel resource is determined according to the foregoing formula, $$\frac{n_{CCE,P}}{N_{CCE,P}}s$$

corresponding to the search spaces are all equal.

Further, when determining that transmission of downlink control information is one of the foregoing optional scenarios, the terminal device enables the plurality of associated search spaces, and determines an uplink control channel resource based on a CCE location occupied by one of the plurality of search spaces. When determining that transmission of the downlink control information is not one of the foregoing optional scenarios, the terminal device does not enable the plurality of associated search spaces.

Alternatively, when detected downlink control information includes an indication or the indication is a preset value, the terminal device may determine that the downlink control information is jointly transmitted or repeatedly transmitted by using the plurality of associated search spaces. In this case, the terminal device may enable the plurality of associated search spaces, and then perform steps 201 and 202.

It can be learned that, in the channel transmission method shown in FIG. 12, the plurality of mutually associated search spaces need to meet a specific condition, for example, the foregoing ratios are all equal or equal to a same value, so that the terminal device can uniquely determine the uplink control channel resource. In addition, when correctly obtaining one piece of downlink control information through decoding, the terminal device may ignore detection in another search space with a same ratio, to reduce blind detection complexity of the terminal device.

Correspondingly, from a perspective of the network side, when the network device sends the downlink control information to the terminal device, a used search space also needs to meet a condition that "ratios of CCE start locations of search spaces to a quantity of CCEs in a control resource set corresponding to the search spaces are all equal". In this way, both the terminal device and the network device can uniquely determine the uplink control channel resource.

In this embodiment of this application, one piece of downlink control information is repeatedly transmitted through a downlink control channel (or referred to as enhanced downlink control channel transmission), or is jointly transmitted through a plurality of downlink control channels (or a plurality of search spaces), and may be notified in an explicit manner, in an implicit manner, or in a combination of the explicit manner and the implicit manner.

For example, a quantity of CORESETs included in an SS set may be limited. When the quantity of CORESETs exceeds 1, the terminal device may consider that downlink control information is repeatedly transmitted through a downlink control channel or is jointly transmitted through a plurality of downlink control channels, and corresponding search spaces are associated. Alternatively, it may be specified that a PDCCH is for repeated transmission in this case.

For another example, whether a plurality of CORESETs included in an SS set belong to a same CORESET group is limited. When CORESET groups to which different CORESETs belong are different, that is, the plurality of CORESETs do not belong to a same CORESET group, it may be considered that downlink control information is repeatedly transmitted through a downlink control channel or is jointly transmitted through a plurality of downlink control channels, and corresponding search spaces are associated. When a CORESET group to which a CORESET belongs is omitted, the CORESET group is 0 by default.

For another example, the network device may deliver one piece of signaling to notify to use a solution of repeated transmission through a downlink control channel or a solution of joint transmission through a plurality of downlink control channels. The association relationship described in the foregoing implementations is established or enabled only after the terminal learns that the solution of repeated transmission through a downlink control channel or the solution of joint transmission through a plurality of downlink control channels is used.

In the foregoing embodiments provided in this application, the method provided in embodiments of this application is separately described from perspectives of the network device and the terminal device. To implement functions in the foregoing methods provided in embodiments of this application, the network device and the terminal device may include a hardware structure and a software module, and implement the foregoing functions in a form of the hardware structure, the software module, or a combination of the hardware structure and the software module. A function in the foregoing functions may be performed in a form of the hardware structure, the software module, or a combination of the hardware structure and the software module.

Figure 14:
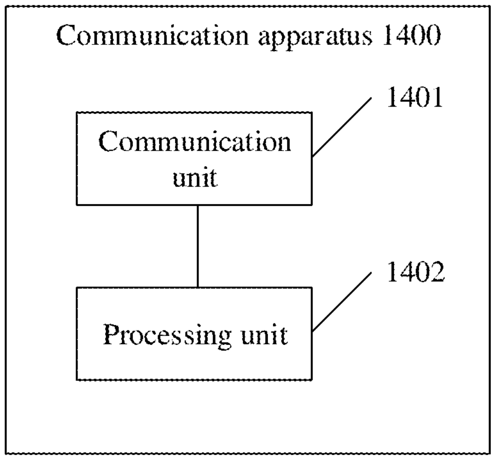
FIG. 14 is a schematic diagram of a structure of a communication apparatus according to an embodiment of this application.

FIG. 14 is a schematic diagram of a structure of a communication apparatus according to an embodiment of this application. The communication apparatus 1400 shown in FIG. 15 may include a communication unit 1401 and a processing unit 1402. The communication unit 1401 may include a sending unit and a receiving unit. The sending unit is configured to implement a sending function, the receiving unit is configured to implement a receiving function, and the communication unit 1401 may implement the sending function and/or the receiving function. The communication unit may also be described as a transceiver unit.

The communication apparatus 1400 may be a terminal device, an apparatus in the terminal device, or an apparatus that can be used together with the terminal device.

In an implementation, the communication apparatus 1400 includes a communication unit 1401 and a processing unit 1402.

The processing unit 1402 is configured to: select, from a plurality of search spaces, a search space that meets a preset condition, where the plurality of search spaces are search spaces for repeated transmission through a same downlink control channel; and determine an uplink control channel resource based on a control channel element CCE start location of the search space that meets the preset condition.

The communication unit 1401 is configured to send an uplink control channel on the uplink control channel resource.

For related content of this implementation, refer to related content of the foregoing method embodiments. Details are not described herein again.

In another implementation, the communication apparatus 1400 includes:

- a processing unit 1402, configured to determine an uplink control channel resource based on a control channel element CCE start location of any one of a plurality of search spaces, and
- a communication unit 1401, configured to receive an uplink control channel on the uplink control channel resource.

The plurality of search spaces are search spaces for repeated transmission through a same downlink control channel, and in the plurality of search spaces, ratios of CCE start locations of the search spaces to a quantity of CCEs in a control resource set corresponding to the search spaces are all equal.

For related content of this implementation, refer to related content of the foregoing method embodiments. Details are not described herein again.

The communication apparatus 1400 may be a network device, an apparatus in the network device, or an apparatus that can be used together with the network device.

In an implementation, the communication apparatus 1400 includes

- a processing unit 1402, configured to: select, from a plurality of search spaces, a search space that meets a preset condition, where the plurality of search spaces are search spaces that are mutually associated and for repeated transmission through a same downlink control channel; and determine an uplink control channel resource based on a control channel element CCE start location of the search space that meets the preset condition; and
- a communication unit 1401, configured to receive an uplink control channel on the uplink control channel resource.

The plurality of associated search spaces are respectively search spaces for repeated transmission through a same downlink control channel.

For related content of this implementation, refer to related content of the foregoing method embodiments. Details are not described herein again.

In another implementation, the communication apparatus 1400 includes:

a processing unit 1401, configured to determine an uplink control channel resource based on a control channel element CCE start location of any one of a plurality of search spaces, and a communication unit 1402, configured to receive an uplink control channel on the uplink control channel resource.

The plurality of search spaces are search spaces for repeated transmission through a same downlink control channel, and in the plurality of search spaces, ratios of CCE start locations of the search spaces to a quantity of CCEs in a control resource set corresponding to the search spaces are all equal.

It can be learned that the communication apparatus may determine the uplink control channel resource based on the CCE start location of the search space that meets the preset condition and that is in the plurality of search spaces, so that the uplink control channel resource can be determined in a scenario of repeated transmission through the downlink control channel. In addition, the communication apparatus limits the plurality of search spaces to some extent. For example, the foregoing ratios are all equal or equal to a same value, so that the terminal device or the network device can uniquely determine the uplink control channel resource. In this embodiment of this application, when correctly obtaining one piece of downlink control information through decoding, the terminal device may ignore detection in another search space, to reduce blind detection complexity of the terminal device.

Figure 15:
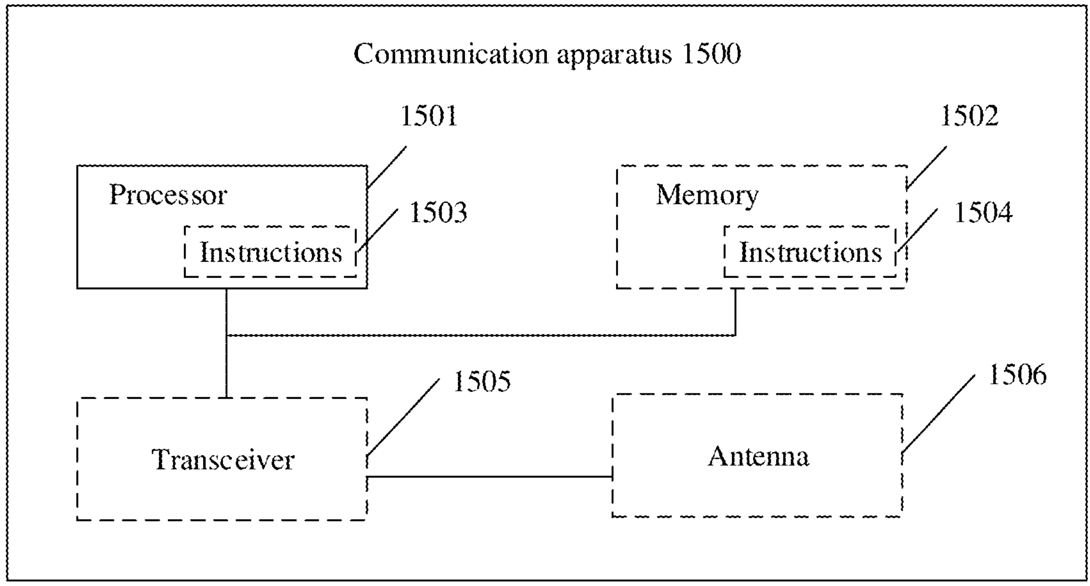
FIG. 15 is a schematic diagram of a structure of another communication apparatus according to an embodiment of this application.

FIG. 15 is a schematic diagram of a structure of another communication apparatus according to an embodiment of this application. The communication apparatus 1500 may be a network device, may be a terminal device, may be a chip, a chip system, a processor, or the like that supports the network device in implementing the foregoing method, or may be a chip, a chip system, a processor, or the like that supports the terminal device in implementing the foregoing method. The apparatus may be configured to implement the method described in the foregoing method embodiment. For details, refer to the descriptions in the foregoing method embodiment.

The communication apparatus 1500 may include one or more processors 1501. The processor 1501 may be a general purpose processor, a dedicated processor, or the like. For example, the processor 1501 may be a baseband processor or a central processing unit. The baseband processor may be configured to process a communication protocol and communication data. The central processing unit may be configured to control a communication apparatus (for example, a base station, a baseband chip, a terminal, a terminal chip, a DU, or a CU), execute a software program, and process data of the software program.

Optionally, the communication apparatus 1500 may include one or more memories 1502. The memory may store instructions 1504, and the instructions may be run on the processor 1501, so that the communication apparatus 1500 performs the method described in the foregoing method embodiments. Optionally, the memory 1502 may further store data. The processor 1501 and the memory 1502 may be disposed separately, or may be integrated together.

Optionally, the communication apparatus 1500 may further include a transceiver 1505 and an antenna 1506. The transceiver 1505 may be referred to as a transceiver unit, a transceiver machine, a transceiver circuit, or the like, and is configured to implement a transceiver function. The transceiver 1505 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function.

The communication apparatus 1500 is a terminal device. The processor 1501 is configured to perform steps 101 and 102 in FIG. 6, step 103 in FIG. 7, or step 201 in FIG. 13. The transceiver 1505 is configured to send an uplink control channel on the uplink control channel resource determined in step 102 in FIG. 6 and FIG. 7, or step 202 in FIG. 13. That the processor 1501 performs step 103 in FIG. 7 may include related operations described in FIG. 8, FIG. 9, and FIG. 10.

The communication apparatus 1500 is a network device. The processor 1501 is configured to perform steps 101 and 102 in FIG. 6, step 103 in FIG. 7, or step 201 in FIG. 13. The transceiver 1505 is configured to receive an uplink control channel on the uplink control channel resource determined by the processor 1501 in step 103 in FIG. 6 and FIG. 7, or perform step 202 in FIG. 13, but the "sending" needs to be replaced with the "receiving" operation. That the processor 1501 performs step 103 in FIG. 7 may include related operations described in FIG. 8, FIG. 9, and FIG. 10.

In another possible design, the processor 1501 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, optionally, the processor 1501 may store instructions 1503. When the instructions 1503 are run on the processor 1501, the communication apparatus 1500 is enabled to perform the method described in the foregoing method embodiments. The instructions 1503 may be fixed in the processor 1501. In this case, the processor 1501 may be implemented by hardware.

In still another possible design, the communication apparatus 1500 may include a circuit, and the circuit may implement a transmitting, receiving, or communication function in the foregoing method embodiments. The processor and the transceiver that are described in this application may be implemented on an integrated circuit (integrated circuit, IC), an analog IC, a radio frequency integrated circuit RFIC, a hybrid signal IC, an application-specific integrated circuit (application-specific integrated circuit, ASIC), a printed circuit board (printed circuit board, PCB), an electronic device, or the like. The processor and the transceiver may be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type channel metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

The communication apparatus in the foregoing embodiment may be a network device or a terminal device. However, a scope of the communication apparatus described in this application is not limited thereto, and a structure of the communication apparatus may not be limited by FIG. 14.

The communication apparatus may be an independent device or may be a part of a large device. For example, the communication apparatus may be:

(1) an independent integrated circuit IC, a chip, or a chip system or subsystem;

(2) a set of one or more ICs, where optionally, the IC set may further include a storage component configured to store data and instructions;

(3) an ASIC, for example, a modem (Modem);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) another device, or the like.

Figure 16:
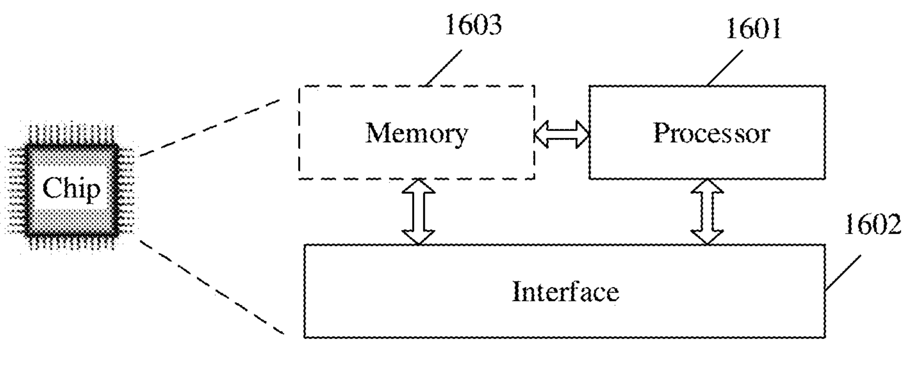
FIG. 16 is a schematic diagram of a structure of a chip according to an embodiment of this application.

For a case in which the communication apparatus may be a chip or a chip system, refer to a schematic diagram of a structure of a chip shown in FIG. 16. The chip 1600 shown in FIG. 16 includes a processor 1601 and an interface 1602. There may be one or more processors 1601, and there may be a plurality of interfaces 1602.

A case in which the chip is configured to implement the function of the terminal device in embodiments of this application is described below.

In an implementation, the processor 1601 is configured to: select, from a plurality of search spaces, a search space that meets a preset condition, where the plurality of search spaces are search spaces for repeated transmission through a same downlink control channel. The processor 1601 is further configured to determine an uplink control channel resource based on a control channel element CCE start location of the search space that meets the preset condition. The interface 1602 is configured to send an uplink control channel on the uplink control channel resource.

In an implementation, the processor 1601 is configured to determine an uplink control channel resource based on a control channel element CCE start location of a search space in which the downlink control channel is detected. The interface 1602 is configured to send an uplink control channel on the uplink control channel resource. The search space in which the downlink control channel is detected is one of a plurality of search spaces, the plurality of search spaces are search spaces for repeated transmission through a same downlink control channel, and in the plurality of search spaces, ratios of CCE start locations of the search spaces to a quantity of CCEs in a control resource set corresponding to the search spaces are all equal.

A case in which the chip is configured to implement the function of the network device in embodiments of this application is described below.

In an implementation, the processor 1601 is configured to: select, from a plurality of search spaces, a search space that meets a preset condition, where the plurality of search spaces are search spaces for repeated transmission through a same downlink control channel. The processor 1601 is further configured to determine an uplink control channel resource based on a control channel element CCE start location of the search space that meets the preset condition. The interface 1602 is configured to send an uplink control channel on the uplink control channel resource.

In another implementation, the processor 1601 is configured to determine an uplink control channel resource based on a control channel element CCE start location of any one of a plurality of search spaces. The interface 1602 is configured to receive an uplink control channel on the uplink control channel resource. The plurality of search spaces are search spaces for repeated transmission through a same downlink control channel, and in the plurality of search spaces, ratios of CCE start locations of the search spaces to a quantity of CCEs in a control resource set corresponding to the search spaces are all equal.

Optionally, the chip further includes a memory 1603. The memory 1603 is configured to store program instructions and data that are necessary for the terminal device.

A person skilled in the art may further understand that various illustrative logical blocks (illustrative logical blocks) and steps (steps) that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the scope of embodiments of this application.

This application further provides a computer-readable storage medium. The computer-readable storage medium stores a computer program, and when the computer-readable storage medium is executed by a computer, a function of any one of the foregoing method embodiments is implemented.

This application further provides a computer program product. When the computer program product is executed by a computer, functions of any one of the foregoing method embodiments are implemented.

All or some of the foregoing embodiments may be implemented through software, hardware, firmware, or any combination thereof. When software is used to implement embodiments, embodiments may be implemented completely or partially in a form of a computer program product. The computer program product includes one or more computer instructions. When the computer instructions are loaded and executed on the computer, the procedure or functions according to embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

A person of ordinary skill in the art may understand that first, second, and various reference numerals in this application are merely distinguished for convenient description, and are not used to limit a scope of embodiments of this application, and also indicate a sequence.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource determining method, comprising:

selecting, by a terminal device from a plurality of search spaces, a search space of the plurality of search spaces that satisfies a preset condition, wherein the plurality of search spaces correspond to search spaces for repeated transmission through a same downlink control channel; and determining, by the terminal device, an uplink control channel resource based on a control channel element (CCE) start location of the search space of the plurality of search spaces that satisfies the preset condition, wherein the preset condition comprises an identifier of a corresponding search space group of a plurality of search space groups that is smallest or largest;

the plurality of search spaces are determined based on an offset value configured by signaling; and the plurality of search spaces in a search space set are sorted by aggregation levels, and the search space set is divided, based on the aggregation levels, into search space subsets corresponding to the aggregation levels, and the offset value is for the search space subset, wherein search spaces in each search space subset have a same aggregation level.

2. The method according to claim 1, wherein the preset condition further comprises one or more of:

an identifier of a corresponding control resource set of a plurality of control resource sets that is smallest or largest;

a corresponding aggregation level of the search space is lowest or highest of the corresponding aggregation level of the plurality of the search spaces;

an identifier of a corresponding CCE start location of the search space is smallest or largest of the corresponding CCE start location of the plurality of the search spaces; or an identifier of a corresponding control resource set group of a plurality of control resource set groups that is smallest or largest.

3. The method according to claim 1, wherein at least one of:

the plurality of search spaces are determined based on one or more control resource sets associated with a search space group; or the plurality of search spaces are determined based on one or more search space groups associated with one control resource set.

4. The method according to claim 1, wherein the plurality of search spaces comprise another search space in which the downlink control channel is detected and at least one search space associated with the another search space in which the downlink control channel is detected.

5. A communication apparatus, comprising a transceiver and a processor, wherein the processor is configured to: select, from a plurality of search spaces, a search space of the plurality of search spaces that satisfies a preset condition, wherein the plurality of search spaces correspond to search spaces for repeated transmission through a same downlink control channel; and determine an uplink control channel resource based on a control channel element (CCE) start location of the search space of the plurality of search spaces that satisfies the preset condition; and the transceiver is configured to send an uplink control channel on the uplink control channel resource, wherein the preset condition comprises an identifier of a corresponding search space group of a plurality of search space groups that is smallest or largest;

the plurality of search spaces are determined by the processor based on an offset value configured by signaling; and the plurality of search spaces in a search space set are sorted by aggregation levels, and the search space set is divided, based on the aggregation levels, into search space subsets corresponding to the aggregation levels, and the offset value is for the search space subset, wherein search spaces in each search space subset have a same aggregation level.

6. The communication apparatus according to claim 5, wherein the preset condition further comprises one or more of:

an identifier of a corresponding control resource set of a plurality of control resource sets that is smallest or largest;

a corresponding aggregation level of the search space is lowest or highest of the corresponding aggregation level of the plurality of the search spaces;

an identifier of a corresponding CCE start location of the search space is smallest or largest of the corresponding CCE start location of the plurality of the search spaces; or an identifier of a corresponding control resource set group of a plurality of control resource set groups that is smallest or largest.

7. The communication apparatus according to claim 5, wherein at least one of:

the plurality of search spaces are determined by the processor based on one or more control resource sets associated with a search space group; or the plurality of search spaces are determined by the processor based on one or more search space groups associated with one control resource set.

8. The communication apparatus according to claim 5, wherein the plurality of search spaces comprise another search space in which the downlink control channel is detected and at least one search space associated with the another search space in which the downlink control channel is detected.

9. A communication apparatus, comprising a processor and a transceiver, wherein the processor is configured to: select, from a plurality of search spaces, a search space of the plurality of search spaces that satisfies a preset condition, wherein the plurality of search spaces correspond to search spaces for repeated transmission through a same downlink control channel; and determine an uplink control channel resource based on a control channel element (CCE) start location of the search space of the plurality of search spaces that satisfies the preset condition; and the transceiver is configured to receive an uplink control channel on the uplink control channel resource, wherein the preset condition comprises an identifier of a corresponding search space group of a plurality of search space groups that is smallest or largest;

the plurality of search spaces are determined by the processor based on an offset value configured by signaling; and the plurality of search spaces in a search space set are sorted by aggregation levels, and the search space set is divided, based on the aggregation levels, into search space subsets corresponding to the aggregation levels, and the offset value is for the search space subset, wherein search spaces in each search space subset have a same aggregation level.

10. The communication apparatus according to claim 9, wherein the preset condition further comprises one or more of:

an identifier of a corresponding control resource set of a plurality of control resource sets that is smallest or largest;

a corresponding aggregation level of the search space is lowest or highest of the corresponding aggregation level of the plurality of the search spaces;

an identifier of a corresponding CCE start location of the search space is smallest or largest of the corresponding CCE start location of the plurality of the search spaces; or an identifier of a corresponding control resource set group of a plurality of control resource set groups that is smallest or largest.

11. The communication apparatus according to claim 9, wherein at least one of:

the plurality of search spaces are determined by the processor based on one or more control resource sets associated with a search space group; or the plurality of search spaces are determined by the processor based on a plurality of search space groups associated with one control resource set.

* * * * *